US010437721B2

(12) United States Patent
Leshinsky et al.

(10) Patent No.: US 10,437,721 B2
(45) Date of Patent: Oct. 8, 2019

(54) EFFICIENT GARBAGE COLLECTION FOR A LOG-STRUCTURED DATA STORE

(71) Applicant: Amazon Technologies, Inc., Seattle, WA (US)

(72) Inventors: Yan Valerie Leshinsky, Kirkland, WA (US); James McClellan Corey, Seattle, WA (US); Samuel James McKelvie, Seattle, WA (US); Oscar Ricardo Moll Thomae, Seattle, WA (US); Pradeep Jnana Madhavarapu, Mountain View, CA (US)

(73) Assignee: Amazon Technologies, Inc., Seattle, WA (US)

(*) Notice: Subject to any disclaimer, the term of this patent is extended or adjusted under 35 U.S.C. 154(b) by 4 days.

(21) Appl. No.: 15/284,414

(22) Filed: Oct. 3, 2016

(65) Prior Publication Data

US 2017/0024315 A1 Jan. 26, 2017

Related U.S. Application Data

(63) Continuation of application No. 14/032,763, filed on Sep. 20, 2013, now Pat. No. 9,460,008.

(51) Int. Cl.

*G06F 16/00* (2019.01)
*G06F 12/02* (2006.01)

(Continued)

(52) U.S. Cl.

CPC ...... *G06F 12/0261* (2013.01); *G06F 12/0238* (2013.01); *G06F 12/0253* (2013.01);

(Continued)

(58) Field of Classification Search

CPC ............ G06F 12/0261; G06F 17/0253; G06F 17/30185; G06F 17/30312;

(Continued)

(56) References Cited

U.S. PATENT DOCUMENTS

| | | |
|---|---|---|
| 5,280,612 A | 1/1994 | Lorie et al. |
| 5,452,445 A | 9/1995 | Hallmark et al. |

(Continued)

FOREIGN PATENT DOCUMENTS

| | | |
|---|---|---|
| CA | 2783370 | 7/2011 |
| EP | 0675451 | 10/1995 |

(Continued)

OTHER PUBLICATIONS

"Amazon Web Services Blog" Downloaded Apr. 30, 2013 from http://aws.typepad.com/aws/2010/10/amazon-rdsannouncing-read-replicas.html, Published Oct. 5, 2010 pp. 1-11.

(Continued)

*Primary Examiner* — Thanh-Ha Dang

(74) *Attorney, Agent, or Firm* — Robert C. Kowert; Meyertons, Hood, Kivlin, Kowert & Goetzel, P.C.

(57) ABSTRACT

A log-structured data store may implement efficient garbage collection. Log records may be maintained in data blocks according to a log record sequence. Based, at least in part, on a log reclamation point, the log records may be evaluated to identify data blocks to reclaim that have log records in the log sequence prior to the log reclamation point. New versions of data pages updated by log records in the identified data blocks may be generated and stored in base page storage for the log structured data store. The identified data blocks may then be reclaimed for storing new data.

19 Claims, 12 Drawing Sheets

(51) Int. Cl.
*G06F 16/22* (2019.01)
*G06F 16/18* (2019.01)

(52) U.S. Cl.
CPC .......... *G06F 16/1805* (2019.01); *G06F 16/22* (2019.01); *G06F 2212/1024* (2013.01); *G06F 2212/1044* (2013.01); *G06F 2212/163* (2013.01); *G06F 2212/214* (2013.01); *G06F 2212/7205* (2013.01)

(58) Field of Classification Search
CPC ..... G06F 2212/1044; G06F 2212/7205; G06F 16/22; G06F 16/1805; G06F 12/0238; G06F 12/0253; G06F 2212/1024; G06F 2212/163; G06F 2212/214
USPC .......................................................... 707/672
See application file for complete search history.

(56) References Cited

U.S. PATENT DOCUMENTS 5,471,614 A 11/1995 Kakimoto
5,524,205 A 6/1996 Lomet et al.
5,530,850 A 6/1996 Ford et al.
5,551,003 A 8/1996 Mattson et al.
5,638,508 A * 6/1997 Kanai ................ G06F 11/1471 711/113
5,870,758 A 2/1999 Bamford et al.
5,907,848 A 5/1999 Zaiken et al.
5,951,695 A 9/1999 Kolovson
6,041,423 A 3/2000 Tsukerman
6,233,585 B1 5/2001 Gupta et al.
6,240,413 B1 5/2001 Learmont
6,247,149 B1 * 6/2001 Falls .................. G06F 11/0748 714/45
6,615,219 B1 9/2003 Bruso et al.
6,631,374 B1 10/2003 Klein et al.
6,732,124 B1 5/2004 Koseki et al.
6,732,171 B2 5/2004 Hayden
6,832,229 B2 12/2004 Reed
6,976,022 B2 12/2005 Vemuri et al.
7,010,645 B2 3/2006 Hetzler et al.
7,047,358 B2 * 5/2006 Lee .................... G06F 11/1076 707/999.202
7,089,253 B2 8/2006 Hinshaw et al.
7,146,386 B2 12/2006 Xiao
7,305,386 B2 12/2007 Hinshaw et al.
7,308,456 B2 12/2007 Friske et al.
7,328,226 B1 2/2008 Karr et al.
7,451,168 B1 * 11/2008 Patterson ............ G06F 12/0269
7,716,645 B2 5/2010 Dolby et al.
7,747,663 B2 6/2010 Atkin et al.
7,769,723 B2 8/2010 Zheng et al.
7,885,922 B2 2/2011 Pareek et al.
7,930,271 B2 4/2011 Tarbell
7,937,551 B2 5/2011 Schott
7,949,693 B1 5/2011 Mason et al.
7,979,670 B2 7/2011 Saliba et al.
8,086,650 B1 12/2011 Milford
8,209,515 B2 6/2012 Schott
8,255,627 B2 8/2012 Blinick et al.
8,266,114 B2 9/2012 Mace et al.
8,271,830 B2 9/2012 Erofeev
8,289,801 B2 10/2012 Smith et al.
8,301,670 B2 10/2012 Revah et al.
8,326,897 B2 12/2012 Butterworth et al.
8,341,128 B1 12/2012 Ruggiero
8,370,715 B2 2/2013 Hafner et al.
8,380,670 B2 2/2013 Kuber et al.
8,392,479 B1 3/2013 Pantin
8,396,831 B2 3/2013 Larson et al.
8,412,689 B2 * 4/2013 Reid ...................... G06F 9/466 707/703
8,412,752 B2 4/2013 Dodge
8,429,121 B2 4/2013 Pareek et al.
8,463,825 B1 * 6/2013 Harty .................... G06F 16/188 707/813
9,460,008 B1 10/2016 Leshinsky et al.
9,785,510 B1 * 10/2017 Madhavarapu ..... G06F 11/1446
9,817,710 B2 * 11/2017 Gupta .................... G06F 11/10
2002/0107835 A1 8/2002 Coram et al.
2002/0143733 A1 10/2002 Mukkamalla et al.
2003/0055809 A1 * 3/2003 Bhat .................. G06F 16/9014
2004/0133622 A1 7/2004 Clubb et al.
2004/0225696 A1 11/2004 Wong et al.
2004/0249869 A1 12/2004 Oksanen
2006/0005080 A1 * 1/2006 Walker ................ G06F 11/3476 714/38.1
2006/0020634 A1 1/2006 Huras et al.
2006/0047626 A1 3/2006 Raheem
2006/0224636 A1 10/2006 Kathuria et al.
2007/0083570 A1 4/2007 Fineberg
2007/0174541 A1 6/2007 Chandrasekaran et al.
2008/0010322 A1 1/2008 Lee et al.
2008/0154983 A1 6/2008 Lee et al.
2008/0183973 A1 7/2008 Aguilera et al.
2008/0294648 A1 11/2008 Lin et al.
2010/0036861 A1 2/2010 Srihari et al.
2010/0050172 A1 2/2010 Ferris
2010/0192131 A1 7/2010 Dolby et al.
2011/0035548 A1 2/2011 Kimmel et al.
2011/0060724 A1 3/2011 Chan
2011/0072217 A1 3/2011 Hoang et al.
2011/0153578 A1 * 6/2011 Pogodin ................ G06F 16/258 707/694
2011/0161496 A1 6/2011 Nicklin
2011/0178984 A1 7/2011 Talius et al.
2011/0251997 A1 10/2011 Wang et al.
2011/0258391 A1 * 10/2011 Atkisson .............. G06F 11/108 711/118
2012/0005196 A1 1/2012 Horii
2012/0011106 A1 * 1/2012 Reid ...................... G06F 9/466 707/695
2012/0041899 A1 2/2012 Greene et al.
2012/0166390 A1 6/2012 Merriman et al.
2012/0174112 A1 7/2012 Vaidya et al.
2012/0191648 A1 7/2012 Kuber et al.
2012/0210041 A1 8/2012 Flynn et al.
2012/0246179 A1 * 9/2012 Garza .................. G06F 16/213 707/752
2012/0259889 A1 10/2012 Dinker et al.
2012/0297073 A1 11/2012 Glover et al.
2012/0310985 A1 12/2012 Gale et al.
2012/0310986 A1 12/2012 Frantz et al.
2012/0310991 A1 12/2012 Frantz et al.
2012/0323849 A1 12/2012 Garin, Jr. et al.
2013/0036281 A1 2/2013 Revah et al.
2013/0042056 A1 2/2013 Shats et al.
2013/0042156 A1 2/2013 Srinivasan et al.
2013/0067288 A1 * 3/2013 Louie .................. G06F 11/0709 714/48
2013/0080386 A1 3/2013 Dwyer et al.
2013/0080388 A1 3/2013 Dwyer et al.
2013/0086129 A1 4/2013 Brown et al.
2014/0068183 A1 * 3/2014 Joshi .................. G06F 12/0866 711/114
2014/0095555 A1 4/2014 Kim et al.
2014/0136575 A1 * 5/2014 Zhao .................... G06F 16/215 707/813
2014/0149353 A1 * 5/2014 Lee ...................... G06F 16/174 707/639
2015/0127889 A1 * 5/2015 Hwang ............... G06F 12/0246 711/103
2015/0317326 A1 11/2015 Bandarupalli et al.
2016/0357639 A1 * 12/2016 Winokur ............. G06F 11/1446
2017/0031741 A1 * 2/2017 Seigel ................... G06F 11/079

FOREIGN PATENT DOCUMENTS

EP 1630674 3/2006
JP H10-254748 9/1998
JP 2000057032 2/2000
JP 2000259474 9/2000

(56) References Cited

FOREIGN PATENT DOCUMENTS

| | | |
|---|---|---|
| JP | 2005276094 | 10/2005 |
| JP | 2007200182 | 8/2007 |
| JP | 2007317017 | 12/2007 |
| JP | 2008003932 | 1/2008 |
| JP | 2012014502 | 1/2012 |
| JP | 2012507072 | 3/2012 |

OTHER PUBLICATIONS

"Bloom Filter" Downloaded from http://en.wikipedia.org/wiki/Bloom_filter on May 15, 2013, pp. 1-12.

John Clarke "SQL Result Set Cache in Oracle 11 gR2" published Nov. 16, 2011 downloaded May 15, 2013 from http://www.centroid.com/knowledgebase/blog/sql-result-set-cache-in-oracle-11 gr2, pp. 1-27.

Jim Czuprynski "Oracle Database 11g: SQL Query Result Set Caching" published Jul. 30, 2008, downloaded May 15, 2013 from http://www.databasejournal.com/features/oracle/article.php/3760761/0racle-Database-11 g-SQL -Query-Result-Set-Caching.htm, pp. 1-7.

"Oracle Database JDBC Developer's Guide and Reference: Chapter 20 Statement and Result Set Caching"downloaded from http://docs.oracle.com/cd/B28359_01/java.1111b31224/stmtcach.htm via the Wayback Machine Nov. 27, 2011, pp. 1-8.

Adrian Billington "Query Result Cache in Oracle 11g" downloaded from http://web.archive.org/web/20080124161135/http://www.oracle-developer.net/display.php?id=503 via the Wayback Machine Jan. 4, 2008, pp. 1-20.

Julian Dontcheff "Bloom Filters for DBAs" published Aug. 28,2012, downloaded from http://juliandontcheff.wordpress.com/2012/08/28/bloom-filters-for-dbas/ on May 14, 2013, pp. 1-4.

Julian Dyke "Result Cache Internals" Nov. 2007, pp. 1-38.

Michele Cyran et al "Oracle Database Concepts 10g Release 2 (10.2)" Oct. 2005, pp. 1-542.

Lance Ashdown et al "Oracle Database Concepts 11g Release 2 (11.2)" Sep. 2011, pp. 1-460.

"Isolation (database systems)" downloaded from http://en.wikipedia.org/wiki/Isolation_(database_systems) on May 15, 2013, pp. 1-7.

U.S. Appl. No. 61/794,572, filed Mar. 15, 2013, Anurag Windlass Gupta, et al.

U.S. Appl. No. 61/799,609, filed Mar. 15, 2013, Anurag Windlass Gupta, et al.

U.S. Appl. No. 61/794,612, filed Mar. 15, 2013, Pradeep Jnana Madhavarapu et al.

U.S. Appl. No. 61/794,658, filed Mar. 15, 2013, Anurag Windlass Gupta, et al.

U.S. Appl. No. 61/799,632, filed Mar. 15, 2013, Anurag Windlass Gupta, et al.

U.S. Appl. No. 13/892,027, filed May 10, 2013, Anurag Windlass Gupta, et al.

U.S. Appl. No. 13/873,467, filed Apr. 30, 2013, Anurag Windlass Gupta, et al.

U.S. Appl. No. 13/902,381, filed May 24, 2013, Anurag Windlass Gupta, et al.

U.S. Appl. No. 13/893,004, filed May 13, 2013, Laurion Darrell Burchall et al.

U.S. Appl. No. 13/901,111, filed May 23, 2013, Anurag Windlass Gupta, et al.

U.S. Appl. No. 13/894,969, filed May 15, 2013, Grant Alexander MacDonald McAlister et al.

U.S. Appl. No. 13/903,674, filed May 28, 2013, Anurag Windlass Gupta, et al.

U.S. Appl. No. 14/033,343, filed Sep. 20, 2013, Tengiz Kharatishvili et al.

U.S. Appl. No. 14/032,721, filed Sep. 20, 2013, Tengiz Kharatishvili et al.

U.S. Appl. No. 14/032,797, filed Sep. 20, 2013, Pradeep Jnana Madhavarapu et al.

U.S. Appl. No. 14/036,783, filed Sep. 25, 2013, Anurag Windlass Gupta, et al.

U.S. Appl. No. 14/036,792, filed Sep. 25, 2013, Samuel James McKelvie, et al.

U.S. Appl. No. 14/032,681, filed Sep. 20, 2013, Samuel James McKelvie, et al.

Latika C. Savade, et al., "A Technique to Search Log Records using System of Linear Equations", Software Engineering (CONSEG), 2012 CSI Sixth International Conference, IEEE, Sep. 5, 2012, pp. 1-4.

Jim Gray, et al., "Transaction Processing: Concepts and Techniques—Chapter 10", In: "The Morgan Kaufmann Series in data management systems", Jan. 1, 1993, pp. 529-582.

Jim Gray, et al., "Transaction Processing: Concepts and Techniques—Chapter 12", In: "The Morgan Kaufmann series in data management systems", Jan. 1, 1993, pp. 631-657.

Mokrane Bouzeghoub, et al., "A Framework for Analysis of Data Freshness", Information Quality in Information Systems, ACM, Jun. 18, 2004, pp. 59-67.

M. Tamer Ozsu, et al., "Princeiples of Distributed Database Systems—Chapter 13—Data Replication", In: Principles of Distributed Database Systems, Third Edition, Mar. 2, 2011, Springer, pp. 459-495.

Hector Garcia-Molina, et al., "Database Systems—The Complete Book Second Edition—Chapter 18—Concurrency Control", In: "Database systems the complete book, Second Edition", Jun. 15, 2005, pp. 883-951.

Atul Adya, et al., "Efficient Optimistic Concurrency Control Using Loosely Synchronized Clocks", SIGMOD Record, ACM, vol. 24, No. 2, May 22, 1995, pp. 23-34.

Neeta Garimella, "Understanding and exploiting snapshot technology for data protection, Part 1: Snapshot technology overview", IBM developerWorks, Apr. 26, 2006, Retrieved from URL: https://web.archive.org/web/20070125115155/http://www-128.ibm.com/developerworks/tivoli/library/t-snaptsm1/index.html, pp. 1-7.

* cited by examiner

EFFICIENT GARBAGE COLLECTION FOR A LOG-STRUCTURED DATA STORE

This application is a continuation of U.S. patent application Ser. No. 14/032,763, filed Sep. 20, 2013, now U.S. Pat. No. 9,460,008, which is hereby incorporated by reference herein in its entirety.

BACKGROUND

Log-structured storage developed in order to provide a more efficient means for storing data in persistent storage devices. Data and metadata changes are sequentially recorded in a log structure reducing the number of operations to persist the data and metadata changes. For systems that frequently add and/or modify data, such as database systems, log-structured storage reduces the latency for recording new data as well as modifying data already stored. As more and more changes are received, the log recording the changes grows. Over time, the log may grow to consume all available space unless more storage space is made available for the log. In order to free up additional storage space, data in the log may be manipulated or moved. These movements, however, increase the number of I/O operations necessary to maintain log-structured storage, dulling the very effectiveness that a log-structured data stored is implemented to provide.

Figure 1:
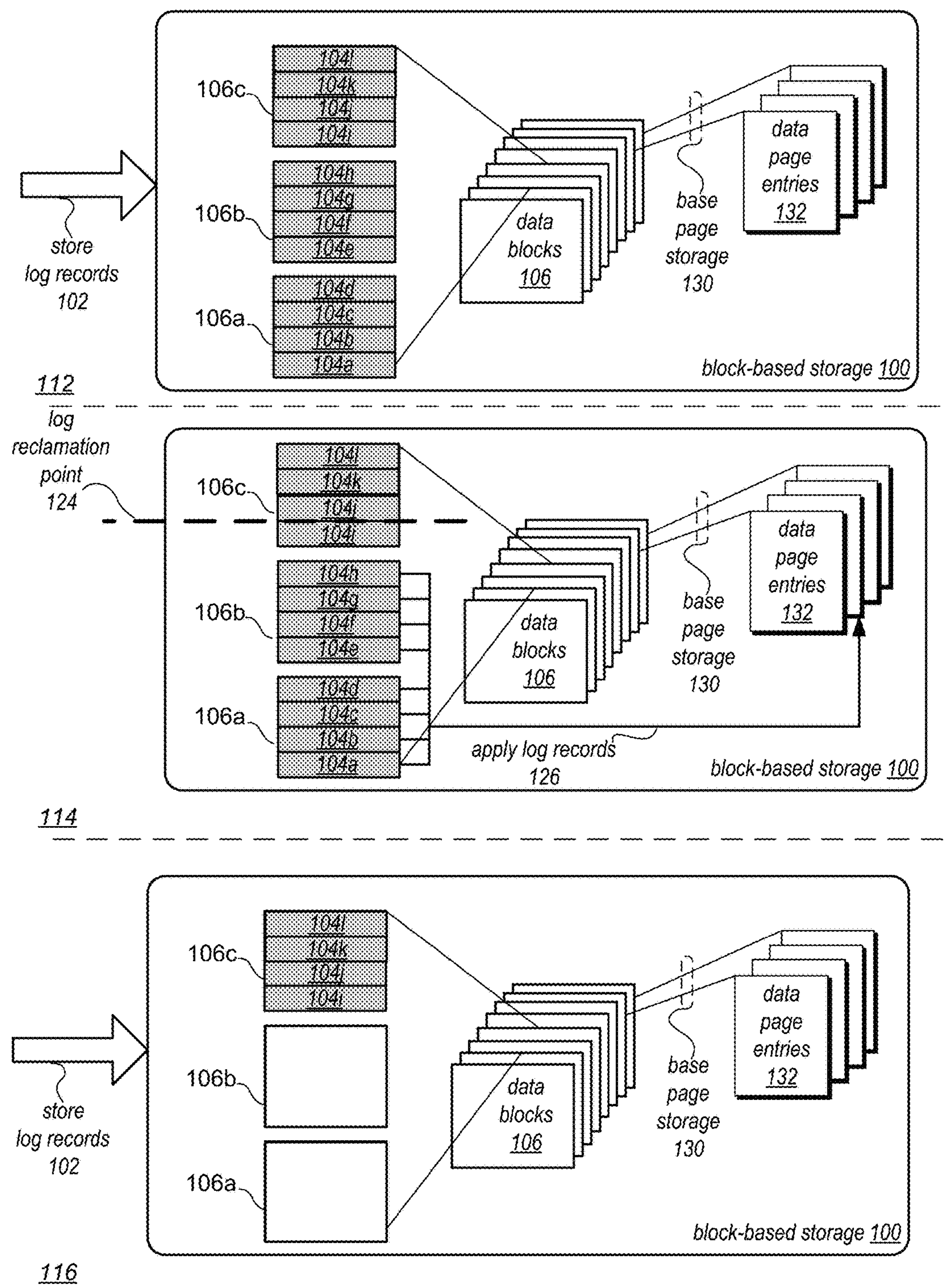
FIG. 1 is a block diagram illustrating log page reclamation for a log-structured data store that implements efficient garbage collection, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a computer system may be configured to perform operations even when the operations are not currently being performed). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Various embodiments of efficient garbage collection for a log-structured data store are described herein. Log records may be received indicating changes to data or metadata maintained as part of a log-structured data store. Log records may be, in some embodiments, ordered according to a log record sequence. For example, each log record may be assigned a unique Log Sequence Number (LSN), which indicates that log record's position in the log record sequence. A log-structured data store may maintain log records in data blocks (or in groups of data blocks, such as pages) according to the log record sequence in a block-based storage device. For example, each data block may maintain a group of log records within a range of the log record sequence that are not maintained in any other blocks (e.g., LSNs 1-20). In at least some embodiments, the log records in a data block may be stored sequentially.

Blocks of log records may be maintained as part of a log structure for a data store. As more and more log records are received, and thus more data blocks used to store the log records, data blocks (or groups of data blocks such as log pages) may be reclaimed. In various embodiments, a log reclamation point may be determined. The log records maintained in the log-structured data store may be evaluated based, at least in part, on the log reclamation point in order to identify data blocks that may be reclaimed. For identified data blocks, the log records maintained in the data block may be used to generate a new version of data page that is updated by the log record. These new versions of data pages may then be persisted in base page storage for the log-structured data store. Base page storage may maintain an entry or version for each data page stored at the log structured data store (e.g., user/client/application data pages). The identified data blocks may be reclaimed for storing new data.

Log-structured data stores increase write efficiency. As updates/changes/writes to data or metadata stored in the log-structured data store are received, a log record is maintained indicating the change, instead of changing (e.g., modifying, deleting, adding, etc.) the data itself The log records may then be used to generate the currently stored version of data in response to access requests for the data. All storage, however, is finite. With increasing numbers of log records to be maintained, the log structure for the data store may grow beyond allocated or available space without some means of obtaining more space for the log. In typical log-structured data stores, older log records may be removed or moved in order to reclaim some space for the log structure. Such techniques are commonly referred to as garbage collection.

Non-moving garbage collection techniques typically identify log records that are no longer needed (e.g., a log record for a value that has since been deleted or change). A manifest or some other listing of available space is maintained that denotes the obsolete log records. New log records are then stored in the available spaces left by the obsolete records. However, when storing new log records, a location must be found that has enough space to store the log records. Over time wasted space in data blocks storing log records (sometimes referred to as internal fragmentation) can occur, increasing the number of operations to read and/or write to the log-structured data store.

Moving (also sometimes called "compacting) garbage collection techniques typically identify log records that are no longer needed and then combine log records that need to be maintained (e.g., those that may be needed to generate a current version of a data page). For example, remaining log records from 5 different data blocks may be combined to create one full (or nearly full) data block. In order to perform a moving/compacting garbage collection technique, numerous read and write operations may need to be performed. For example, a data block with holes (i.e., unneeded log records) must first be read. Then, the maintained log records must be written to one or more other data blocks with the space to store them. This process may be repeated several times in order to reclaim data blocks for storing new data, such as log records.

A log-structured data store may implement efficient garbage collection in various different ways. FIG. 1 is a block diagram illustrating log page reclamation for a log-structured data store that implements efficient garbage collection, according to some embodiments. Log records 102 may be received at log-structured data store 100. Log records may be stored in free or available data blocks 106 of block-based storage 100. Data pages may be groupings or collections of data blocks that store user/application/client data in groupings understood by or designated by the user/application/client that is using block-based storage device 100. In at least some embodiments, data pages may store data for a database system (e.g., records for a database table). Groupings of data blocks 106 may be used in order to provide base page storage 130 in block-based storage 100. Base page storage 130 may maintain data page entries 132 describing or storing a version of each data page.

As illustrated at scene 112, log records may be stored 102 at block-based storage device 100. Block-based storage device 100 may be one or more block-based storage devices that implement persistent storage for data. In some embodiments block-based storage device 100 may be implemented as part of a log-structured data store. Log structured data stores may be stand alone, or distributed among one or more storage nodes, such as described below with regard to FIGS. 3-8, systems, such as computing system 1200 described below with regard to FIG. 12, or devices, such as one or more of various block-based persistent storage devices (e.g., hard disk drives, solid states drives, etc.), configured to persist data and/or metadata in a log. A data block may be a logical range of a block-based storage device storing a range of data (e.g., a multiple of 2 or more bits).

In the illustrated example, data blocks **106*a*, 106*b*, and 106*c* store log records. For example, data block 106*a* stores log records 104*a*, 104*b*, 104*c*, and 104*d*. Data block 106*b* stores log records 104*e*, 104*f*, 104*g*, and 104*h*. While data block 106*c* stores log records 104*i*, 104*j*, 104*k*, and 104*l*. The log records maintained in the data blocks 106*a*-106*c* may be log records that are part of a log structure maintained at block-based storage device 100. These log records may be maintained according to a log record sequence. For example, data block 106*a* maintains log records 104*a*, 104*b*, 104*c*, and 104*d*. These log records may be stored in this order, or stored in any order within the data block as long as the range of log records is a contiguous portion of the sequence of log records (e.g., 104*c*, 104*b*, 104*a*, and 104*d*). As noted above, the log records may each indicate or describe an update to a data page maintained at block-based storage 100**.

In some embodiment, each log record written to a data block may be appended to the previous log record written to that data block. Log records may be appended until the data block is full or has no available space to store a complete log record. Log records may be received out-of-order in some embodiments. Thus, in some embodiments, log records may be first written to a data block that is part of an initial buffer or "hot" log portion of block-based storage 100, and then subsequently copied to a data block according to the log record sequence that is part of a cold-storage portion of block-based storage 100. Log records may be moved from the hot log portion to the cold log portion when a next complete portion of log records for the log record sequence is received, that is not yet stored in the cold log portion.

Scene 114 illustrates efficient garbage collection for block-based storage 100. A reclamation event may be detected, in various embodiments. A reclamation event may be a determination that an available or free space threshold for block-based storage 100 has been crossed. For example, block-based storage 100 may have an available space threshold of 20%. When the current available space threshold falls below 20%, then a log reclamation event may be triggered/detected. Log reclamation events may be determined based on one or multiple different factors, such as maintaining a reserve processing capacity for foreground processing, delaying until enough identified data blocks for reclamation are identified, or some other space or performance related factor may be used to detect or trigger the performance of efficient reclamation. In some embodiments, multiple factors may compete or indicate different timing for performing reclamation (e.g., available space vs. capacity to process). These various factors may thus be balanced, according to various priority rules or schemes. Similarly, efficient reclamation may be dynamically scheduled based on these multiple factors for performance at a later time.

In various embodiments, a log reclamation point 124 in the log record sequence may be determined and/or received. Log reclamation point 124 may indicate a point in the log record sequence that deems log records prior to log reclamation point 124 collectible and/or a range or group of log records that is collectible. For example, in some embodiments log reclamation point 124 may identify a range of log records in the log record sequence, each of which may have been backed-up to archive storage. Log reclamation point 124 may also be determined based, at least in part, on a user initiated storage action that directs a storage system implementing log-structured storage to preserve a view or version of data (e.g., create a snapshot of the stored data). A data retention policy may also identify a length of time that certain log records may be retained, which may, in some embodiments, be used to determine a log reclamation point. A data retention policy, or other factor, may be used to modify another reclamation point determination factor (e.g., data retention policy may modify the range of log records that were backed-up to a data archive that are then indicated by the log reclamation point). Log reclamation point 124 may be received from another system, module or device, such as a log-structured data store manager, or may be determined locally at the system or device implementing block-based storage 100.

Based, at least in part, on log reclamation point 124, the log records in the data blocks may be evaluated to identify data blocks for reclamation. As illustrated in 114, log reclamation point 124 illustrates a point in the log record sequence that falls between log record 104*i* and 104*j*. As some log records in data block 106*c* may still need to be preserved, data blocks 106*b* and 106*a* may be identified for reclamation. This evaluation of the log records maintained in data blocks 106 may be performed in different ways. For example, in some embodiments, log reclamation point 124 may be a LSN which may then be compared with other LSNs maintained in each data block. If a data block only contains LSNs prior to log reclamation point 124, then those data blocks may be reclaimed.

The log records in data blocks identified for reclamation may be used to generate new versions of the data pages for which they indicate updates. As noted above, each log record may be each linked to or associated with a particular data page. The log record may indicate or describe an update, change, or modification to that page (e.g., adding a value, changing a value, deleting a value, etc. . . . ). Thus, the log records (104*a*-104*h*) in data blocks 106*a* and 106*c* may be applied 126 to generate new versions of the data pages to be stored in their respective data page entries 132 in based page storage 130. If, for instance, a log record indicates that a value maintained in a data page is to be incremented by 1, then the generated version of the data page including the log record may reflected that value of the page incremented by 1. Multiple log records may be linked to the same data page, thus, in some embodiments, generating a new version of the data page may be performed by applying all of the log records in the identified data blocks to be reclaimed for the page as part of the same operation to generate a new version of the data page. Some or all log records in data blocks may each be linked to different or the same data pages, in some embodiments.

As noted above, versions of data pages may, in some embodiments, be maintained in respective entries 132 base page storage 130. Mapping information, such as an index or other structure, may be used to identify the corresponding entries in base page storage 130 to their respective data pages. Versions of data pages maintained or persisted in base page version 130 may be used to service access requests or provide a view of the database at a particular time. For example, if a data page is rarely updated, it may be the case that any log records linked to the data page may be part of log pages that have been garbage collected. When access request, such as a read request for the data page is received, the data page may be read from backstop 130 in order to service the request. More recently received log records may also be applied to generate a current version of the data page.

As illustrated at scene 116, data blocks 106*a* and 106*b* may be reclaimed. Any information persisted in the log records formerly stored in these data blocks may now be persisted in data page entries 132. Reclaiming data blocks may be performed in various ways. In some embodiments, blocks may have the same format, whether storing data for a log or a data page. As a result, only mapping information and/or header information for the reclaimed data blocks may need to be modified. Alternatively, in some embodiments data blocks may be reformatted in order to be reclaimed. New data, such as log records 102, may be stored in data blocks 106*a* and 106*b*.

Please note, FIG. 1 is provided as a logical illustration of efficient garbage collection in a log-structured data store, and is not intended to be limiting as to the physical arrangement, size, or number of components, modules, or devices, implementing a log-structured data store.

The specification first describes an example of a log-structured data store implemented as a distributed storage service. The distributed storage service may store data for many different types of clients, in various embodiments. One such client may be a network-based database service, describe in further detail below. Included in the description of the example network-based database service are various aspects of the example network-based database service along with the various interactions between the database service and the distributed storage service. The specification then describes a flowchart of various embodiments of methods for efficient garbage collection for a log-structured data store. Next, the specification describes an example system that may implement the disclosed techniques. Various examples are provided throughout the specification.

The systems described herein may, in some embodiments, implement a network-based service that enables clients (e.g., subscribers) to operate a data storage system in a cloud computing environment. In some embodiments, the data storage system may be an enterprise-class database system that is highly scalable and extensible. In some embodiments, queries may be directed to database storage that is distributed across multiple physical resources, and the database system may be scaled up or down on an as needed basis. The database system may work effectively with database schemas of various types and/or organizations, in different embodiments. In some embodiments, clients/subscribers may submit queries in a number of ways, e.g., interactively via an SQL interface to the database system. In other embodiments, external applications and programs may submit queries using Open Database Connectivity (ODBC) and/or Java Database Connectivity (JDBC) driver interfaces to the database system.

More specifically, the systems described herein may, in some embodiments, implement a service-oriented architecture in which various functional components of a single database system are intrinsically distributed. For example, rather than lashing together multiple complete and monolithic database instances (each of which may include extraneous functionality, such as an application server, search functionality, or other functionality beyond that required to provide the core functions of a database), these systems may organize the basic operations of a database (e.g., query processing, transaction management, caching and storage) into tiers that may be individually and independently scalable. For example, in some embodiments, each database instance in the systems described herein may include a database tier (which may include a single database engine head node and a client-side storage system driver), and a separate, distributed storage system (which may include multiple storage nodes that collectively perform some of the operations traditionally performed in the database tier of existing systems).

As described in more detail herein, in some embodiments, some of the lowest level operations of a database, (e.g., backup, restore, snapshot, recovery, log record manipulation, and/or various space management operations) may be offloaded from the database engine to the storage layer (or tier), such as a distributed storage system, and distributed across multiple nodes and storage devices. For example, in some embodiments, rather than the database engine applying changes to a database (or data pages thereof) and then sending the modified data pages to the storage layer, the application of changes to the stored database (and data pages thereof) may be the responsibility of the storage layer itself. In such embodiments, redo log records, rather than modified data pages, may be sent to the storage layer, after which redo processing (e.g., the application of the redo log records) may be performed somewhat lazily and in a distributed manner (e.g., by a background process). In some embodiments, crash recovery (e.g., the rebuilding of data pages from stored redo log records) may also be performed by the storage layer and may also be performed by a distributed (and, in some cases, lazy) background process.

In some embodiments, because only redo logs (and not modified data pages) are sent to the storage layer, there may be much less network traffic between the database tier and the storage layer than in existing database systems. In some embodiments, each redo log may be on the order of one-tenth the size of the corresponding data page for which it specifies a change. Note that requests sent from the database tier and the distributed storage system may be asynchronous and that multiple such requests may be in flight at a time.

In general, after being given a piece of data, a primary requirement of a database is that it can eventually give that piece of data back. To do this, the database may include several different components (or tiers), each of which performs a different function. For example, a traditional database may be thought of as having three tiers: a first tier for performing query parsing, optimization and execution; a second tier for providing transactionality, recovery, and durability; and a third tier that provides storage, either on locally attached disks or on network-attached storage. As noted above, previous attempts to scale a traditional database have typically involved replicating all three tiers of the database and distributing those replicated database instances across multiple machines.

In some embodiments, the systems described herein may partition functionality of a database system differently than in a traditional database, and may distribute only a subset of the functional components (rather than a complete database instance) across multiple machines in order to implement scaling. For example, in some embodiments, a client-facing tier may be configured to receive a request specifying what data is to be stored or retrieved, but not how to store or retrieve the data. This tier may perform request parsing and/or optimization (e.g., SQL parsing and optimization), while another tier may be responsible for query execution. In some embodiments, a third tier may be responsible for providing transactionality and consistency of results. For example, this tier may be configured to enforce some of the so-called ACID properties, in particular, the Atomicity of transactions that target the database, maintaining Consistency within the database, and ensuring Isolation between the transactions that target the database. In some embodiments, a fourth tier may then be responsible for providing Durability of the stored data in the presence of various sorts of faults. For example, this tier may be responsible for change logging, recovery from a database crash, managing access to the underlying storage volumes and/or space management in the underlying storage volumes.

In various embodiments, a database instance may include multiple functional components (or layers), each of which provides a portion of the functionality of the database instance. In one such example, a database instance may include a query parsing and query optimization layer, a query execution layer, a transactionality and consistency management layer, and a durability and space management layer. As noted above, in some existing database systems, scaling a database instance may involve duplicating the entire database instance one or more times (including all of the example layers), and then adding glue logic to stitch them together. In some embodiments, the systems described herein may instead offload the functionality of durability and space management layer from the database tier to a separate storage layer, and may distribute that functionality across multiple storage nodes in the storage layer.

In some embodiments, the database systems described herein may retain much of the structure of the upper half of the database instance, such as query parsing and query optimization layer, a query execution layer, and a transactionality and consistency management layer, but may redistribute responsibility for at least portions of the backup, restore, snapshot, recovery, and/or various space management operations to the storage tier. Redistributing functionality in this manner and tightly coupling log processing between the database tier and the storage tier may improve performance, increase availability and reduce costs, when compared to previous approaches to providing a scalable database. For example, network and input/output bandwidth requirements may be reduced, since only redo log records (which are much smaller in size than the actual data pages) may be shipped across nodes or persisted within the latency path of write operations. In addition, the generation of data pages can be done independently in the background on each storage node (as foreground processing allows), without blocking incoming write operations. In some embodiments, the use of log-structured, non-overwrite storage may allow backup, restore, snapshots, point-in-time recovery, and volume growth operations to be performed more efficiently, e.g., by using metadata manipulation rather than movement or copying of a data page. In some embodiments, the storage layer may also assume the responsibility for the replication of data stored on behalf of clients (and/or metadata associated with that data, such as redo log records) across multiple storage nodes. For example, data (and/or metadata) may be replicated locally (e.g., within a single "availability zone" in which a collection of storage nodes executes on its own physically distinct, independent infrastructure) and/or across availability zones in a single region or in different regions.

In various embodiments, the database systems described herein may support a standard or custom application programming interface (API) for a variety of database operations. For example, the API may support operations for creating a database, creating a table, altering a table, creating a user, dropping a user, inserting one or more rows in a table, copying values, selecting data from within a table (e.g., querying a table), canceling or aborting a query, creating a snapshot, and/or other operations.

In some embodiments, the database tier of a database instance may include a database engine head node server that receives read and/or write requests from various client programs (e.g., applications) and/or subscribers (users), then parses them and develops an execution plan to carry out the associated database operation(s). For example, the database engine head node may develop the series of steps necessary to obtain results for complex queries and joins. In some embodiments, the database engine head node may manage communications between the database tier of the database system and clients/subscribers, as well as communications between the database tier and a separate distributed storage system.

In some embodiments, the database engine head node may be responsible for receiving SQL requests from end clients through a JDBC or ODBC interface and for performing SQL processing and transaction management (which may include locking) locally. However, rather than generating data pages locally, the database engine head node (or various components thereof) may generate redo log records and may ship them to the appropriate nodes of a separate distributed storage system. In some embodiments, a client-side driver for the distributed storage system may be hosted on the database engine head node and may be responsible for routing redo log records to the storage system node (or nodes) that store the segments (or data pages thereof) to which those redo log records are directed. For example, in some embodiments, each segment may be mirrored (or otherwise made durable) on multiple storage system nodes that form a protection group. In such embodiments, the client-side driver may keep track of the nodes on which each segment is stored and may route redo logs to all of the nodes on which a segment is stored (e.g., asynchronously and in parallel, at substantially the same time), when a client request is received. As soon as the client-side driver receives an acknowledgement back from a write quorum of the storage nodes in the protection group (which may indicate that the redo log record has been written to the storage node), it may send an acknowledgement of the requested change to the database tier (e.g., to the database engine head node). For example, in embodiments in which data is made durable through the use of protection groups, the database engine head node may not be able to commit a transaction until and unless the client-side driver receives a reply from enough storage node instances to constitute a write quorum. Similarly, for a read request directed to a particular segment, the client-side driver may route the read request to all of the nodes on which the segment is stored (e.g., asynchronously and in parallel, at substantially the same time). As soon as the client-side driver receives the requested data from a read quorum of the storage nodes in the protection group, it may return the requested data to the database tier (e.g., to the database engine head node).

In some embodiments, the database tier (or more specifically, the database engine head node) may include a cache in which recently accessed data pages are held temporarily. In such embodiments, if a write request is received that targets a data page held in such a cache, in addition to shipping a corresponding redo log record to the storage layer, the database engine may apply the change to the copy of the data page held in its cache. However, unlike in other database systems, a data page held in this cache may not ever be flushed to the storage layer, and it may be discarded at any time (e.g., at any time after the redo log record for a write request that was most recently applied to the cached copy has been sent to the storage layer and acknowledged). The cache may implement any of various locking mechanisms to control access to the cache by at most one writer (or multiple readers) at a time, in different embodiments. Note, however, that in embodiments that include such a cache, the cache may not be distributed across multiple nodes, but may exist only on the database engine head node for a given database instance. Therefore, there may be no cache coherency or consistency issues to manage.

In some embodiments, the database tier may support the use of synchronous or asynchronous read replicas in the system, e.g., read-only copies of data on different nodes of the database tier to which read requests can be routed. In such embodiments, if the database engine head node for a given database receives a read request directed to a particular data page, it may route the request to any one (or a particular one) of these read-only copies. In some embodiments, the client-side driver in the database engine head node may be configured to notify these other nodes about updates and/or invalidations to cached data pages (e.g., in order to prompt them to invalidate their caches, after which they may request updated copies of updated data pages from the storage layer).

In some embodiments, the client-side driver running on the database engine head node may expose a private interface to the storage tier. In some embodiments, it may also expose a traditional iSCSI interface to one or more other components (e.g., other database engines or virtual computing services components). In some embodiments, storage for a database instance in the storage tier may be modeled as a single volume that can grow in size without limits, and that can have an unlimited number of IOPS associated with it. When a volume is created, it may be created with a specific size, with a specific availability/durability characteristic (e.g., specifying how it is replicated), and/or with an IOPS rate associated with it (e.g., both peak and sustained). For example, in some embodiments, a variety of different durability models may be supported, and users/subscribers may be able to specify, for their database, a number of replication copies, zones, or regions and/or whether replication is synchronous or asynchronous based upon their durability, performance and cost objectives.

In some embodiments, the client side driver may maintain metadata about the volume and may directly send asynchronous requests to each of the storage nodes necessary to fulfill read requests and write requests without requiring additional hops between storage nodes. For example, in some embodiments, in response to a request to make a change to a database, the client-side driver may be configured to determine the one or more nodes that are implementing the storage for the targeted data page, and to route the redo log record(s) specifying that change to those storage nodes. The storage nodes may then be responsible for applying the change specified in the redo log record to the targeted data page at some point in the future. As writes are acknowledged back to the client-side driver, the client-side driver may advance the point at which the volume is durable and may acknowledge commits back to the database tier. As previously noted, in some embodiments, the client-side driver may not ever send data pages to the storage node servers. This may not only reduce network traffic, but may also remove the need for the checkpoint or background writer threads that constrain foreground-processing throughput in previous database systems.

In some embodiments, many read requests may be served by the database engine head node cache. However, write requests may require durability, since large-scale failure events may be too common to allow only in-memory replication. Therefore, the systems described herein may be configured to minimize the cost of the redo log record write operations that are in the foreground latency path by implementing data storage in the storage tier as two regions: a small append-only log-structured region into which redo log records are written when they are received from the database tier, and a larger region in which log records are coalesced together to create new versions of data pages in the background. In some embodiments, an in-memory structure may be maintained for each data page that points to the last redo log record for that page, backward chaining log records until an instantiated data block is referenced. This approach may provide good performance for mixed read-write workloads, including in applications in which reads are largely cached.

In some embodiments, because accesses to the log-structured data storage for the redo log records may consist of a series of sequential input/output operations (rather than random input/output operations), the changes being made may be tightly packed together. It should also be noted that, in contrast to existing systems in which each change to a data page results in two input/output operations to persistent data storage (one for the redo log and one for the modified data page itself), in some embodiments, the systems described herein may avoid this "write amplification" by coalescing data pages at the storage nodes of the distributed storage system based on receipt of the redo log records.

As previously noted, in some embodiments, the storage tier of the database system may be responsible for taking database snapshots. However, because the storage tier implements log-structured storage, taking a snapshot of a data page (e.g., a data block) may include recording a timestamp associated with the redo log record that was most recently applied to the data page/block (or a timestamp associated with the most recent operation to coalesce multiple redo log records to create a new version of the data page/block), and preventing garbage collection of the previous version of the page/block and any subsequent log entries up to the recorded point in time. For example, the log page reclamation point may be determined so that log pages storing the log entries included in the snapshot are not reclaimed as part of efficient garbage collection techniques, such as those described below with regard to FIG. 9. In such embodiments, taking a database snapshot may not require reading, copying, or writing the data block, as would be required when employing an off-volume backup strategy. In some embodiments, the space requirements for snapshots may be minimal, since only modified data would require additional space, although user/subscribers may be able to choose how much additional space they want to keep for on-volume snapshots in addition to the active data set. In different embodiments, snapshots may be discrete (e.g., each snapshot may provide access to all of the data in a data page as of a specific point in time) or continuous (e.g., each snapshot may provide access to all versions of the data that existing in a data page between two points in time). In some embodiments, reverting to a prior snapshot may include recording a log record to indicate that all redo log records and data pages since that snapshot are invalid and garbage collectable, and discarding all database cache entries after the snapshot point. In such embodiments, no roll-forward may be required since the storage system will, on a block-by-block basis, apply redo log records to data blocks as requested and in the background across all nodes, just as it does in normal forward read/write processing. Crash recovery may thereby be made parallel and distributed across nodes.

Figure 2:
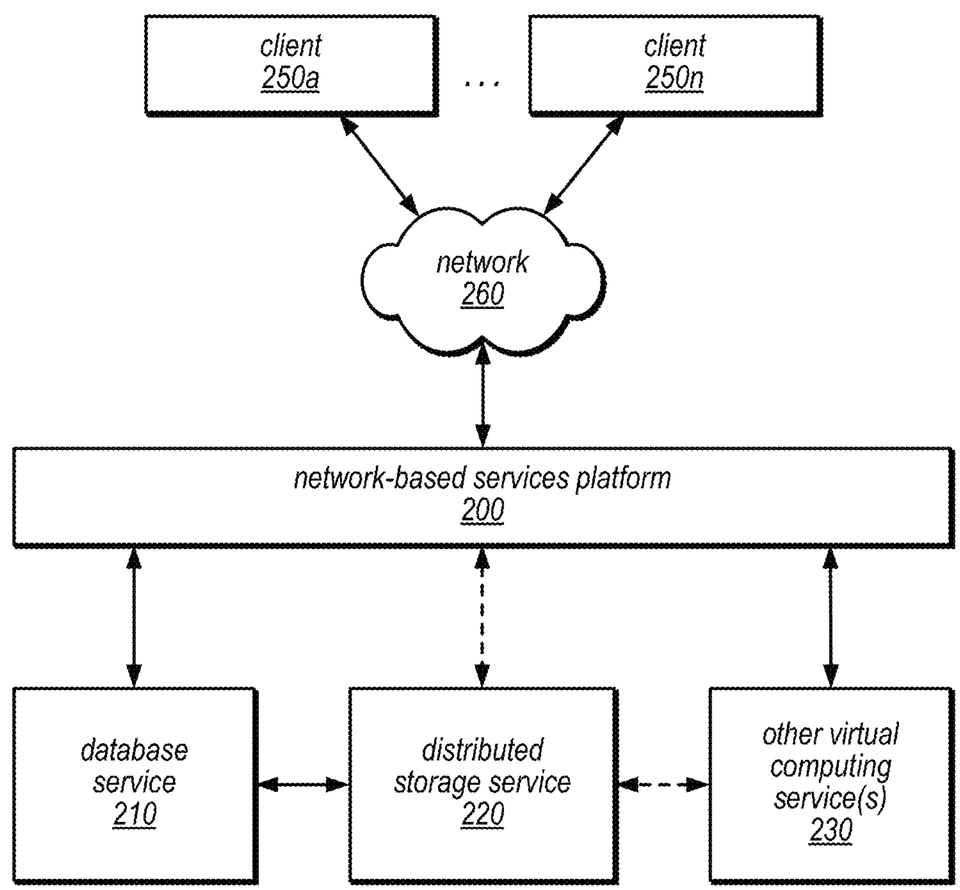
FIG. 2 is a block diagram illustrating a service system architecture that may be configured to implement a network-based database service and a network-based distributed storage service, according to some embodiments.

One embodiment of a service system architecture that may be configured to implement a network-based services-based database service is illustrated in FIG. 2. In the illustrated embodiment, a number of clients (shown as clients 250*a*-250*n*) may be configured to interact with a network-based services platform 200 via a network 260. Network-based services platform 200 may be configured to interface with one or more instances of a database service 210, a distributed storage service 220 and/or one or more other virtual computing services 230. It is noted that where one or more instances of a given component may exist, reference to that component herein may be made in either the singular or the plural. However, usage of either form is not intended to preclude the other.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 12 and described below. In various embodiments, the functionality of a given service system component (e.g., a component of the database service or a component of the storage service) may be implemented by a particular node or may be distributed across several nodes. In some embodiments, a given node may implement the functionality of more than one service system component (e.g., more than one database service system component).

Generally speaking, clients 250 may encompass any type of client configurable to submit network-based services requests to network-based services platform 200 via network

260, including requests for database services (e.g., a request to generate a snapshot, etc.). For example, a given client 250 may include a suitable version of a web browser, or may include a plug-in module or other type of code module configured to execute as an extension to or within an execution environment provided by a web browser. Alternatively, a client 250 (e.g., a database service client) may encompass an application such as a database application (or user interface thereof), a media application, an office application or any other application that may make use of persistent storage resources to store and/or access one or more databases. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application configured to interact directly with network-based services platform 200. In some embodiments, client 250 may be configured to generate network-based services requests according to a Representational State Transfer (REST)-style network-based services architecture, a document- or message-based network-based services architecture, or another suitable network-based services architecture.

In some embodiments, a client 250 (e.g., a database service client) may be configured to provide access to network-based services-based storage of databases to other applications in a manner that is transparent to those applications. For example, client 250 may be configured to integrate with an operating system or file system to provide storage in accordance with a suitable variant of the storage models described herein. However, the operating system or file system may present a different storage interface to applications, such as a conventional file system hierarchy of files, directories and/or folders. In such an embodiment, applications may not need to be modified to make use of the storage system service model of FIG. 1. Instead, the details of interfacing to network-based services platform 200 may be coordinated by client 250 and the operating system or file system on behalf of applications executing within the operating system environment.

Clients 250 may convey network-based services requests (e.g., a snapshot request, parameters of a snapshot request, read request, restore a snapshot, etc.) to and receive responses from network-based services platform 200 via network 260. In various embodiments, network 260 may encompass any suitable combination of networking hardware and protocols necessary to establish network-based-based communications between clients 250 and platform 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and network-based services platform 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and network-based services platform 200. It is noted that in some embodiments, clients 250 may communicate with network-based services platform 200 using a private network rather than the public Internet. For example, clients 250 may be provisioned within the same enterprise as a database service system (e.g., a system that implements database service 210 and/or distributed storage service 220). In such a case, clients 250 may communicate with platform 200 entirely through a private network 260 (e.g., a LAN or WAN that may use Internet-based communication protocols but which is not publicly accessible).

Generally speaking, network-based services platform 200 may be configured to implement one or more service endpoints configured to receive and process network-based services requests, such as requests to access data pages (or records thereof). For example, network-based services platform 200 may include hardware and/or software configured to implement a particular endpoint, such that an HTTP-based network-based services request directed to that endpoint is properly received and processed. In one embodiment, network-based services platform 200 may be implemented as a server system configured to receive network-based services requests from clients 250 and to forward them to components of a system that implements database service 210, distributed storage service 220 and/or another virtual computing service 230 for processing. In other embodiments, network-based services platform 200 may be configured as a number of distinct systems (e.g., in a cluster topology) implementing load balancing and other request management features configured to dynamically manage large-scale network-based services request processing loads. In various embodiments, network-based services platform 200 may be configured to support REST-style or document-based (e.g., SOAP-based) types of network-based services requests.

In addition to functioning as an addressable endpoint for clients' network-based services requests, in some embodiments, network-based services platform 200 may implement various client management features. For example, platform 200 may coordinate the metering and accounting of client usage of network-based services, including storage resources, such as by tracking the identities of requesting clients 250, the number and/or frequency of client requests, the size of data tables (or records thereof) stored or retrieved on behalf of clients 250, overall storage bandwidth used by clients 250, class of storage requested by clients 250, or any other measurable client usage parameter. Platform 200 may also implement financial accounting and billing systems, or may maintain a database of usage data that may be queried and processed by external systems for reporting and billing of client usage activity. In certain embodiments, platform 200 may be configured to collect, monitor and/or aggregate a variety of storage service system operational metrics, such as metrics reflecting the rates and types of requests received from clients 250, bandwidth utilized by such requests, system processing latency for such requests, system component utilization (e.g., network bandwidth and/or storage utilization within the storage service system), rates and types of errors resulting from requests, characteristics of stored and requested data pages or records thereof (e.g., size, data type, etc.), or any other suitable metrics. In some embodiments such metrics may be used by system administrators to tune and maintain system components, while in other embodiments such metrics (or relevant portions of such metrics) may be exposed to clients 250 to enable such clients to monitor their usage of database service 210, distributed storage service 220 and/or another virtual computing service 230 (or the underlying systems that implement those services).

In some embodiments, network-based services platform 200 may also implement user authentication and access control procedures. For example, for a given network-based services request to access a particular database, platform 200 may be configured to ascertain whether the client 250 associated with the request is authorized to access the particular database. Platform 200 may determine such authorization by, for example, evaluating an identity, password or other credential against credentials associated with the particular database, or evaluating the requested access to the particular database against an access control list for the particular database. For example, if a client 250 does not have sufficient credentials to access the particular database, platform 200 may reject the corresponding network-based services request, for example by returning a response to the requesting client 250 indicating an error condition. Various access control policies may be stored as records or lists of access control information by database service 210, distributed storage service 220 and /or other virtual computing services 230.

It is noted that while network-based services platform 200 may represent the primary interface through which clients 250 may access the features of a database system that implements database service 210, it need not represent the sole interface to such features. For example, an alternate API that may be distinct from a network-based services interface may be used to allow clients internal to the enterprise providing the database system to bypass network-based services platform 200. Note that in many of the examples described herein, distributed storage service 220 may be internal to a computing system or an enterprise system that provides database services to clients 250, and may not be exposed to external clients (e.g., users or client applications). In such embodiments, the internal "client" (e.g., database service 210) may access distributed storage service 220 over a local or private network, shown as the solid line between distributed storage service 220 and database service 210 (e.g., through an API directly between the systems that implement these services). In such embodiments, the use of distributed storage service 220 in storing databases on behalf of clients 250 may be transparent to those clients. In other embodiments, distributed storage service 220 may be exposed to clients 250 through network-based services platform 200 to provide storage of databases or other information for applications other than those that rely on database service 210 for database management. This is illustrated in FIG. 2 by the dashed line between network-based services platform 200 and distributed storage service 220. In such embodiments, clients of the distributed storage service 220 may access distributed storage service 220 via network 260 (e.g., over the Internet). In some embodiments, a virtual computing service 230 may be configured to receive storage services from distributed storage service 220 (e.g., through an API directly between the virtual computing service 230 and distributed storage service 220) to store objects used in performing computing services 230 on behalf of a client 250. This is illustrated in FIG. 2 by the dashed line between virtual computing service 230 and distributed storage service 220. In some cases, the accounting and/or credentialing services of platform 200 may be unnecessary for internal clients such as administrative clients or between service components within the same enterprise.

Although not illustrated, in various embodiments distributed storage service 220 may be configured to interface with backup data store, system, service, or device. Various data, such as data pages, log records, and/or any other data maintained by distributed storage service internal clients, such as database service 210 or other virtual computing services 230, and/or external clients such as clients 250*a* through 250*n*, may be sent to a backup data store.

Note that in various embodiments, different storage policies may be implemented by database service 210 and/or distributed storage service 220. Examples of such storage policies may include a durability policy (e.g., a policy indicating the number of instances of a database (or data page thereof) that will be stored and the number of different nodes on which they will be stored) and/or a load balancing policy (which may distribute databases, or data pages thereof, across different nodes, volumes and/or disks in an attempt to equalize request traffic). In addition, different storage policies may be applied to different types of stored items by various one of the services. For example, in some embodiments, distributed storage service 220 may implement a higher durability for redo log records than for data pages.

Figure 3:
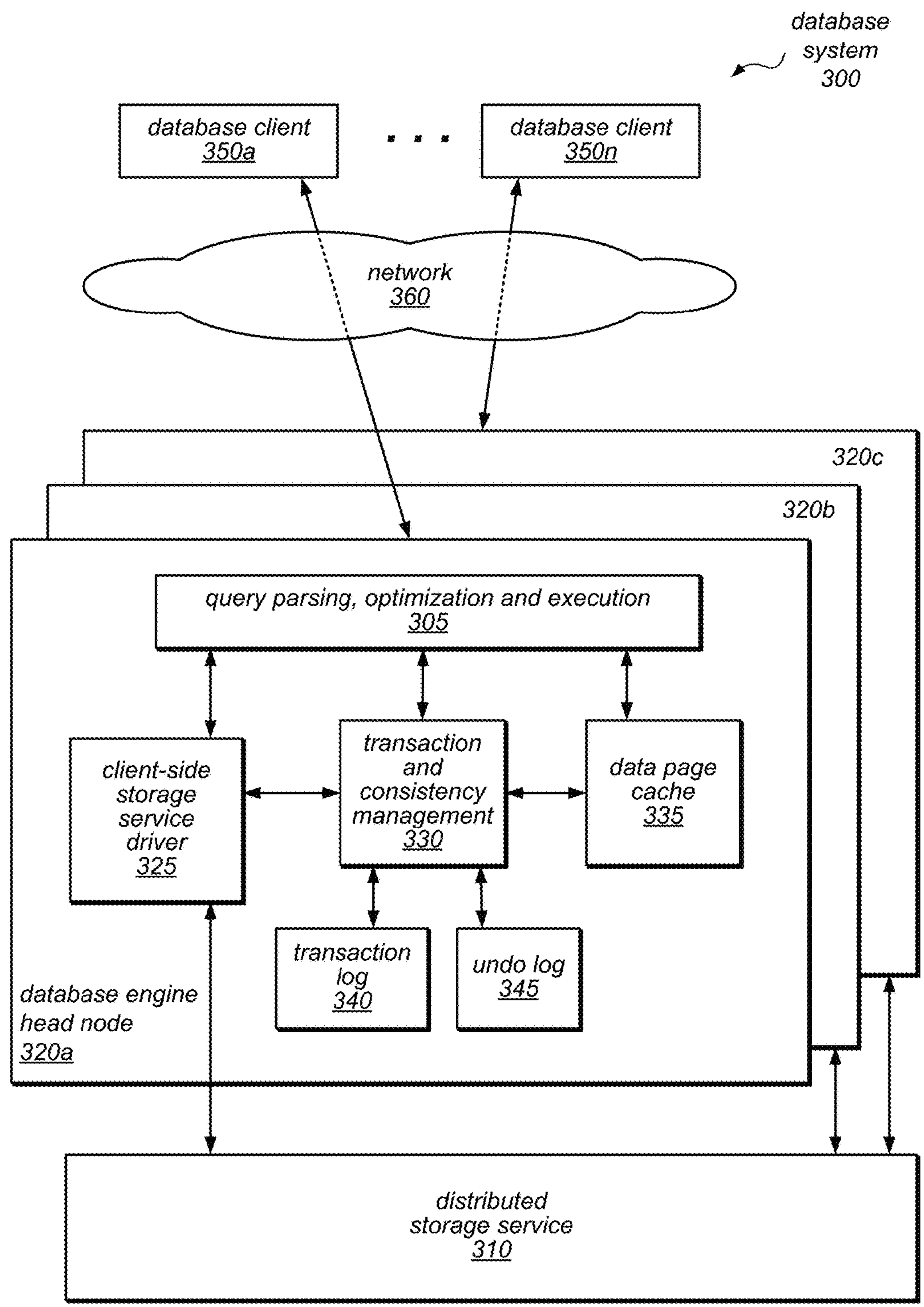
FIG. 3 is a block diagram illustrating various components of a database system that includes a database engine and a separate distributed storage service, according to some embodiments.

FIG. 3 is a block diagram illustrating various components of a database system that includes a database engine and a separate distributed database storage service, according to one embodiment. In this example, database system 300 includes a respective database engine head node 320 for each of several databases and a distributed storage service 310 (which may or may not be visible to the clients of the database system, shown as database clients 350*a*-350*n*). As illustrated in this example, one or more of database clients 350*a*-350*n* may access a database head node 320 (e.g., head node 320*a*, head node 320*b*, or head node 320*c*, each of which is a component of a respective database instance) via network 360 (e.g., these components may be network-addressable and accessible to the database clients 350*a*-350*n*). However, distributed storage service 310, which may be employed by the database system to store data pages of one or more databases (and redo log records and/or other metadata associated therewith) on behalf of database clients 350*a*-350*n*, and to perform other functions of the database system as described herein, may or may not be network-addressable and accessible to the storage clients 350*a*-350*n*, in different embodiments. For example, in some embodiments, distributed storage service 310 may perform various storage, access, change logging, recovery, log record manipulation, and/or space management operations in a manner that is invisible to storage clients 350*a*-350*n*.

As previously noted, each database instance may include a single database engine head node 320 that receives requests (e.g., a snapshot request, etc.) from various client programs (e.g., applications) and/or subscribers (users), then parses them, optimizes them, and develops an execution plan to carry out the associated database operation(s). In the example illustrated in FIG. 3, a query parsing, optimization, and execution component 305 of database engine head node 320*a* may perform these functions for queries that are received from database client 350*a* and that target the database instance of which database engine head node 320*a* is a component. In some embodiments, query parsing, optimization, and execution component 305 may return query responses to database client 350*a*, which may include write acknowledgements, requested data pages (or portions thereof), error messages, and or other responses, as appropriate. As illustrated in this example, database engine head node 320*a* may also include a client-side storage service driver 325, which may route read requests and/or redo log records to various storage nodes within distributed storage service 310, receive write acknowledgements from distributed storage service 310, receive requested data pages from distributed storage service 310, and/or return data pages, error messages, or other responses to query parsing, optimization, and execution component 305 (which may, in turn, return them to database client 350*a*).

In this example, database engine head node 320*a* includes a data page cache 335, in which data pages that were recently accessed may be temporarily held. As illustrated in FIG. 3, database engine head node 320*a* may also include a transaction and consistency management component 330, which may be responsible for providing transactionality and consistency in the database instance of which database engine head node 320*a* is a component. For example, this component may be responsible for ensuring the Atomicity, Consistency, and Isolation properties of the database instance and the transactions that are directed that the database instance. As illustrated in FIG. 3, database engine head node 320*a* may also include a transaction log 340 and an undo log 345, which may be employed by transaction and consistency management component 330 to track the status of various transactions and roll back any locally cached results of transactions that do not commit.

Note that each of the other database engine head nodes 320 illustrated in FIG. 3 (e.g., 320*b* and 320*c*) may include similar components and may perform similar functions for queries received by one or more of database clients 350*a*-350*n* and directed to the respective database instances of which it is a component.

In some embodiments, the distributed storage systems described herein may organize data in various logical volumes, segments, and pages for storage on one or more storage nodes. For example, in some embodiments, each database is represented by a logical volume, and each logical volume is segmented over a collection of storage nodes. Each segment, which lives on a particular one of the storage nodes, contains a set of contiguous block addresses. In some embodiments, each data page is stored in a segment, such that each segment stores a collection of one or more data pages and a change log (also referred to as a redo log) (e.g., a log of redo log records) for each data page that it stores. As described in detail herein, the storage nodes may be configured to receive redo log records (which may also be referred to herein as ULRs) and to coalesce them to create new versions of the corresponding data pages and/or additional or replacement log records (e.g., lazily and/or in response to a request for a data page or a database crash). In some embodiments, data pages and/or change logs may be mirrored across multiple storage nodes, according to a variable configuration (which may be specified by the client on whose behalf the databases are being maintained in the database system). For example, in different embodiments, one, two, or three copies of the data or change logs may be stored in each of one, two, or three different availability zones or regions, according to a default configuration, an application-specific durability preference, or a client-specified durability preference.

As used herein, the following terms may be used to describe the organization of data by a distributed storage system, according to various embodiments.

Volume: A volume is a logical concept representing a highly durable unit of storage that a user/client/application of the storage system understands. More specifically, a volume is a distributed store that appears to the user/client/application as a single consistent ordered log of write operations to various user pages of a database. Each write operation may be encoded in a User Log Record (ULR), which represents a logical, ordered mutation to the contents of a single user page within the volume. As noted above, a ULR may also be referred to herein as a redo log record. Each ULR may include a unique identifier (e.g., a Logical Sequence Number (LSN)). Each ULR may be persisted to one or more synchronous segments in the distributed store that form a Protection Group (PG), to provide high durability and availability for the ULR. A volume may provide an LSN-type read/write interface for a variable-size contiguous range of bytes.

In some embodiments, a volume may consist of multiple extents, each made durable through a protection group. In such embodiments, a volume may represent a unit of storage composed of a mutable contiguous sequence of Volume Extents. Reads and writes that are directed to a volume may be mapped into corresponding reads and writes to the constituent volume extents. In some embodiments, the size of a volume may be changed by adding or removing volume extents from the end of the volume.

Segment: A segment is a limited-durability unit of storage assigned to a single storage node. More specifically, a segment provides limited best-effort durability (e.g., a persistent, but non-redundant single point of failure that is a storage node) for a specific fixed-size byte range of data. This data may in some cases be a mirror of user-addressable data, or it may be other data, such as volume metadata or erasure coded bits, in various embodiments. A given segment may live on exactly one storage node. Within a storage node, multiple segments may live on each SSD, and each segment may be restricted to one SSD (e.g., a segment may not span across multiple SSDs). In some embodiments, a segment may not be required to occupy a contiguous region on an SSD; rather there may be an allocation map in each SSD describing the areas that are owned by each of the segments. As noted above, a protection group may consist of multiple segments spread across multiple storage nodes. In some embodiments, a segment may provide an LSN-type read/write interface for a fixed-size contiguous range of bytes (where the size is defined at creation). In some embodiments, each segment may be identified by a Segment UUID (e.g., a universally unique identifier of the segment).

Storage page: A storage page is a block of memory, generally of fixed size. In some embodiments, each page is a block of memory (e.g., of virtual memory, disk, or other physical memory) of a size defined by the operating system, and may also be referred to herein by the term "data block". More specifically, a storage page may be a set of contiguous sectors. It may serve as the unit of allocation in SSDs, as well as the unit in log pages for which there is a header and metadata. In some embodiments, and in the context of the database systems described herein, the term "page" or "storage page" may refer to a similar block of a size defined by the database configuration, which may typically a multiple of 2, such as 4096, 8192, 16384, or 32768 bytes.

Log page: A log page is a type of storage page that is used to store log records (e.g., redo log records or undo log records). In some embodiments, log pages may be identical in size to storage pages. Each log page may include a header containing metadata about that log page, e.g., metadata identifying the segment to which it belongs. Note that a log page is a unit of organization and may not necessarily be the unit of data included in write operations. For example, in some embodiments, during normal forward processing, write operations may write to the tail of the log one sector at a time.

Log Records: Log records (e.g., the individual elements of a log page) may be of several different classes. For example, User Log Records (ULRs), which are created and understood by users/clients/applications of the storage system, may be used to indicate changes to user data in a volume. Control Log Records (CLRs), which are generated by the storage system, may contain control information used to keep track of metadata such as the current unconditional volume durable LSN (VDL). Null Log Records (NLRs) may in some embodiments be used as padding to fill in unused space in a log sector or log page. In some embodiments, there may be various types of log records within each of these classes, and the type of a log record may correspond to a function that needs to be invoked to interpret the log record. For example, one type may represent all the data of a user page in compressed format using a specific compression format; a second type may represent new values for a byte range within a user page; a third type may represent an increment operation to a sequence of bytes interpreted as an integer; and a fourth type may represent copying one byte range to another location within the page. In some embodiments, log record types may be identified by GUIDs (rather than by integers or enums), which may simplify versioning and development, especially for ULRs.

Payload: The payload of a log record is the data or parameter values that are specific to the log record or to log records of a particular type. For example, in some embodiments, there may be a set of parameters or attributes that most (or all) log records include, and that the storage system itself understands. These attributes may be part of a common log record header/structure, which may be relatively small compared to the sector size. In addition, most log records may include additional parameters or data specific to that log record type, and this additional information may be considered the payload of that log record. In some embodiments, if the payload for a particular ULR is larger than the user page size, it may be replaced by an absolute ULR (an AULR) whose payload includes all the data for the user page. This may enable the storage system to enforce an upper limit on the size of the payload for ULRs that is equal to the size of user pages.

Note that when storing log records in the segment log, the payload may be stored along with the log header, in some embodiments. In other embodiments, the payload may be stored in a separate location, and pointers to the location at which that payload is stored may be stored with the log header. In still other embodiments, a portion of the payload may be stored in the header, and the remainder of the payload may be stored in a separate location. If the entire payload is stored with the log header, this may be referred to as in-band storage; otherwise the storage may be referred to as being out-of-band. In some embodiments, the payloads of most large AULRs may be stored out-of-band in the cold zone of log (which is described below).

User pages: User pages are the byte ranges (of a fixed size) and alignments thereof for a particular volume that are visible to users/clients of the storage system. User pages are a logical concept, and the bytes in particular user pages may or not be stored in any storage page as-is. The size of the user pages for a particular volume may be independent of the storage page size for that volume. In some embodiments, the user page size may be configurable per volume, and different segments on a storage node may have different user page sizes. In some embodiments, user page sizes may be constrained to be a multiple of the sector size (e.g., 4 KB), and may have an upper limit (e.g., 64 KB). The storage page size, on the other hand, may be fixed for an entire storage node and may not change unless there is a change to the underlying hardware.

Data page: A data page is a type of storage page that is used to store user page data in compressed form. In some embodiments every piece of data stored in a data page is associated with a log record, and each log record may include a pointer to a sector within a data page (also referred to as a data sector). In some embodiments, data pages may not include any embedded metadata other than that provided by each sector. There may be no relationship between the sectors in a data page. Instead, the organization into pages may exist only as an expression of the granularity of the allocation of data to a segment.

Storage node: A storage node is a single virtual machine that on which storage node server code is deployed. Each storage node may contain multiple locally attached SSDs, and may provide a network API for access to one or more segments. In some embodiments, various nodes may be on an active list or on a degraded list (e.g., if they are slow to respond or are otherwise impaired, but are not completely unusable). In some embodiments, the client-side driver may assist in (or be responsible for) classifying nodes as active or degraded, for determining if and when they should be replaced, and/or for determining when and how to redistribute data among various nodes, based on observed performance.

SSD: As referred to herein, the term "SSD" may refer to a local block storage volume as seen by the storage node, regardless of the type of storage employed by that storage volume, e.g., disk, a solid-state drive, a battery-backed RAM, a non-volatile RAM device (e.g., one or more NV-DIMMs) or another type of persistent storage device. An SSD is not necessarily mapped directly to hardware. For example, a single solid-state storage device might be broken up into multiple local volumes where each volume is split into and striped across multiple segments, and/or a single drive may be broken up into multiple volumes simply for ease of management, in different embodiments. In some embodiments, each SSD may store an allocation map at a single fixed location. This map may indicate which storage pages that are owned by particular segments, and which of these pages are log pages (as opposed to data pages). In some embodiments, storage pages may be pre-allocated to each segment so that forward processing may not need to wait for allocation. Any changes to the allocation map may need to be made durable before newly allocated storage pages are used by the segments.

Figure 4:
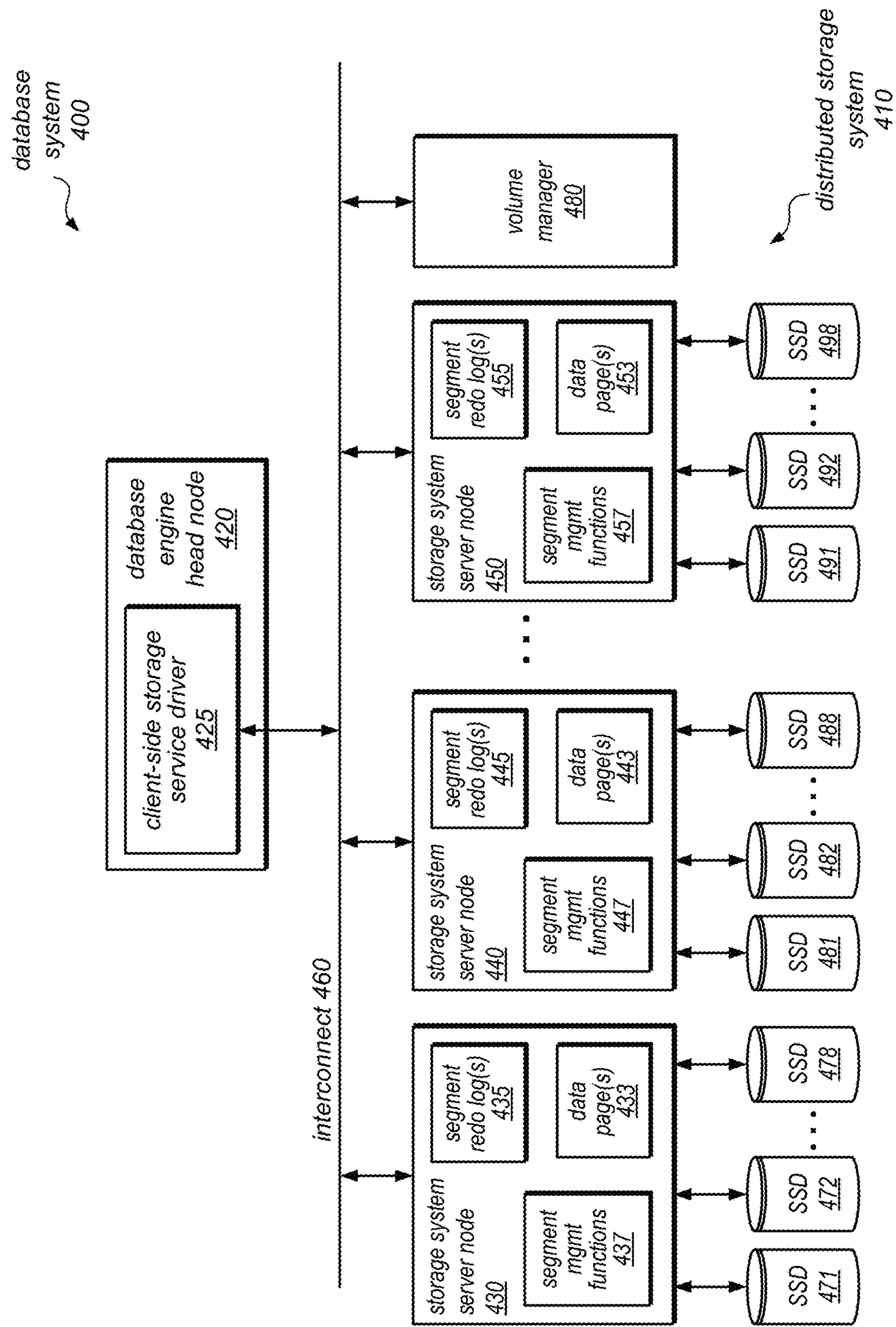
FIG. 4 is a block diagram illustrating a distributed storage system, according to some embodiments.

One embodiment of a distributed storage system is illustrated by the block diagram in FIG. 4. Although discussed in the context of the interacting with database system 400, distributed storage system 410 may more broadly illustrate the various components of a distributed storage system implementing log-structured storage. Thus storage system server nodes 430, 440, through 450 may each implement efficient garbage collection as discussed in further detail below with regard to FIGS. 7 and 9-11. In some embodiments, storage nodes 430-450 may perform garbage collection at the same or near the same time (i.e., synchronously), or independently (asynchronously) from one another. A centralized authority, such as volume manager 480 (which may be another node or instance implemented for the distribute storage system 410, such as on one or more computing devices, such as computer system 1200 described below with regard to FIG. 12) or other module, may determine a log reclamation point for the storage nodes 430-450 according to the various methods and techniques discussed below with regard to FIG. 11, and broadcast the log reclamation point to the storage nodes upon a change, increment or other modification of the log reclamation point, in various embodiments. For example, volume manager 480 may direct, detect, and/or determine the archival of log records and/or other data maintained by distributed storage system

410 to backup data storage, and determine a log reclamation point such that data blocks containing log records that are currently archived may be garbage collected. Volume manager 480 may then send a Garbage Collection LSN (GCL) to indicate the log reclamation point to storage nodes 430-450. Volume manager 480 may also implement various other techniques, such as those described below with regard to FIG. 9 in order to determine a reclamation point for the log page reclamation point. In some embodiments, storage nodes 430-450 may also determine the log reclamation point, such as by requesting the log reclamation point from volume manager 480, or querying other storage nodes to reach a consensus on log records that may be garbage collected.

In at least some embodiments, storage nodes 430-450 may store data for different clients as part of a multi-tenant storage service. For example, the various segments discussed above and below with regard to FIG. 8, may correspond to different protection groups and volumes for different clients. As noted above, some storage nodes may perform garbage collection independent from other storage nodes. Consider the scenario where a storage node maintains data for two different clients. One client's data may be actively accessed/modified, causing the log structure for that data to grow quickly. Though, the other data maintained for the other client may be accessed infrequently, garbage collection may be performed to reclaim data blocks storing log records for the other data in order to make more data blocks available for the more active log.

In some embodiments, a database system 400 may be a client of distributed storage system 410, which communicates with a database engine head node 420 over interconnect 460. As in the example illustrated in FIG. 3, database engine head node 420 may include a client-side storage service driver 425. In this example, distributed storage system 410 includes multiple storage system server nodes (including those shown as 430, 440, and 450), each of which includes storage for data pages and redo logs for the segment(s) it stores, and hardware and/or software configured to perform various segment management functions. For example, each storage system server node may include hardware and/or software configured to perform at least a portion of any or all of the following operations: replication (locally, e.g., within the storage node), coalescing of redo logs to generate data pages, snapshots (e.g., creating, restoration, deletion, etc.), log management (e.g., manipulating log records), crash recovery, and/or space management (e.g., for a segment). Each storage system server node may also have multiple attached storage devices (e.g., SSDs) on which data blocks may be stored on behalf of clients (e.g., users, client applications, and/or database service subscribers).

In the example illustrated in FIG. 4, storage system server node 430 includes data page(s) 433, segment redo log(s) 435, segment management functions 437, and attached SSDs 471-478. Again note that the label "SSD" may or may not refer to a solid-state drive, but may more generally refer to a local block-based storage volume, regardless of its underlying hardware. Similarly, storage system server node 440 includes data page(s) 443, segment redo log(s) 445, segment management functions 447, and attached SSDs 481-488; and storage system server node 450 includes data page(s) 453, segment redo log(s) 455, segment management functions 457, and attached SSDs 491-498.

As previously noted, in some embodiments, a sector is the unit of alignment on an SSD and may be the maximum size on an SSD that can be written without the risk that the write will only be partially completed. For example, the sector size for various solid-state drives and spinning media may be 4 KB. In some embodiments of the distributed storage systems described herein, each and every sector may include have a 64-bit (8 byte) CRC at the beginning of the sector, regardless of the higher-level entity of which the sector is a part. In such embodiments, this CRC (which may be validated every time a sector is read from SSD) may be used in detecting corruptions. In some embodiments, each and every sector may also include a "sector type" byte whose value identifies the sector as a log sector, a data sector, or an uninitialized sector. For example, in some embodiments, a sector type byte value of 0 may indicate that the sector is uninitialized.

In some embodiments, each of the storage system server nodes in the distributed storage system may implement a set of processes running on the node server's operating system that manage communication with the database engine head node, e.g., to receive redo logs, send back data pages, etc. In some embodiments, all data blocks written to the distributed storage system may be backed up to long-term and/or archival storage (e.g., in a remote key-value durable backup storage system).

Figure 5:
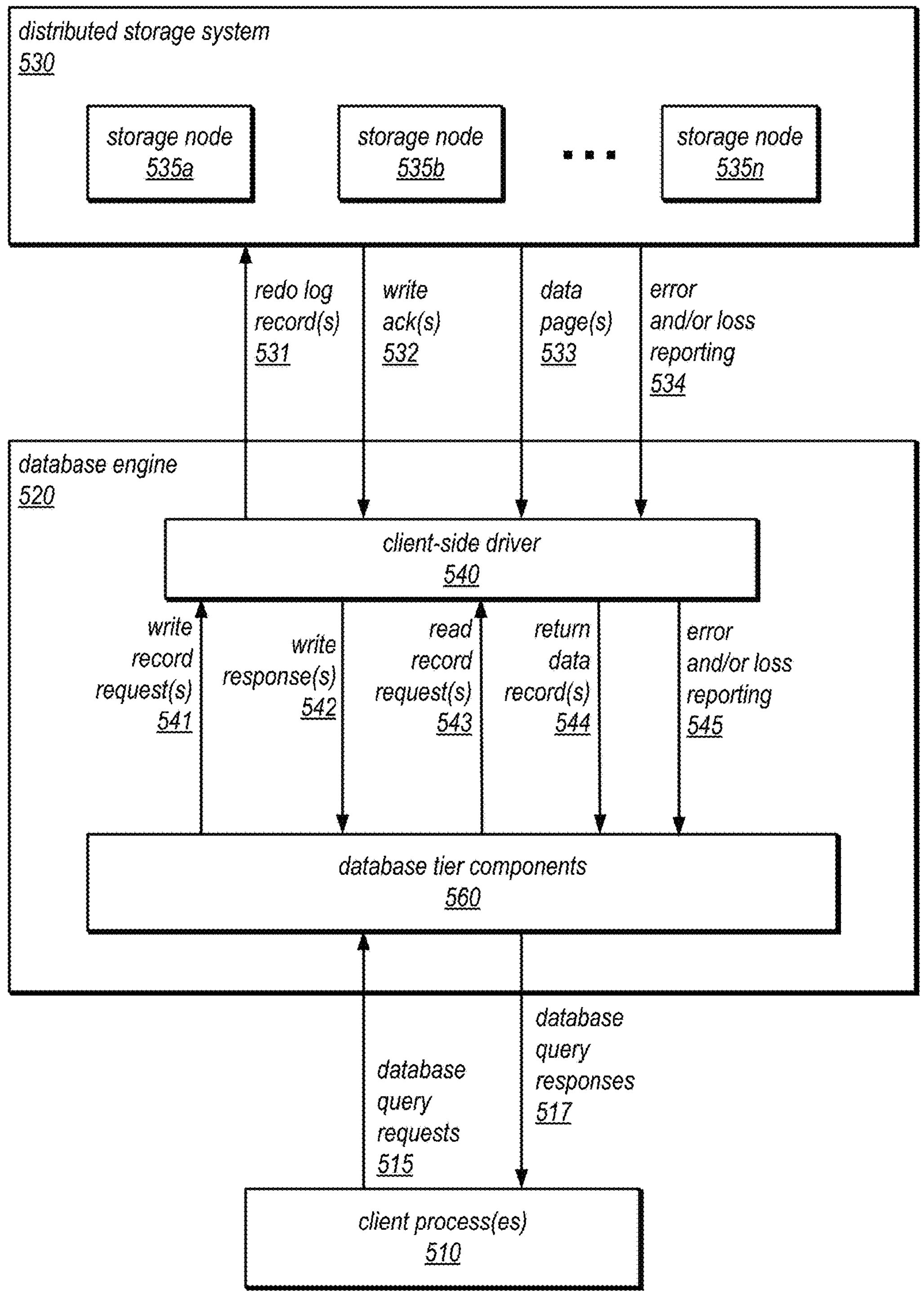
FIG. 5 is a block diagram illustrating the use of a separate distributed storage system in a database system, according to some embodiments.

FIG. 5 is a block diagram illustrating the use of a separate distributed storage system in a database system, according to one embodiment. In this example, one or more client processes 510 may store data to one or more databases maintained by a database system that includes a database engine 520 and a distributed storage system 530. In the example illustrated in FIG. 5, database engine 520 includes database tier components 560 and client-side driver 540 (which serves as the interface between distributed storage system 530 and database tier components 560). In some embodiments, database tier components 560 may perform functions such as those performed by query parsing, optimization and execution component 305 and transaction and consistency management component 330 of FIG. 3, and/or may store data pages, transaction logs and/or undo logs (such as those stored by data page cache 335, transaction log 340 and undo log 345 of FIG. 3).

In this example, one or more client processes 510 may send database query requests 515 (which may include read and/or write requests targeting data stored on one or more of the storage nodes **535*a*-535*n*) to database tier components 560, and may receive database query responses 517 from database tier components 560 (e.g., responses that include write acknowledgements and/or requested data). Each database query request 515 that includes a request to write to a data page may be parsed and optimized to generate one or more write record requests 541, which may be sent to client-side driver 540 for subsequent routing to distributed storage system 530. In this example, client-side driver 540 may generate one or more redo log records 531 corresponding to each write record request 541, and may send them to specific ones of the storage nodes 535 of distributed storage system 530. Distributed storage system 530 may return a corresponding write acknowledgement 523 for each redo log record 531 to database engine 520 (specifically to client-side driver 540). Client-side driver 540 may pass these write acknowledgements to database tier components 560 (as write responses 542), which may then send corresponding responses (e.g., write acknowledgements) to one or more client processes 510 as one of database query responses 517**.

In this example, each database query request 515 that includes a request to read a data page may be parsed and optimized to generate one or more read record requests 543, which may be sent to client-side driver 540 for subsequent routing to distributed storage system 530. In this example, client-side driver 540 may send these requests to specific ones of the storage nodes 535 of distributed storage system 530, and distributed storage system 530 may return the requested data pages 533 to database engine 520 (specifically to client-side driver 540). In at least some embodiments, the requested data pages may be serviced from a data page entry in a backstop data structure maintained at a storage node 535 that maintains the data. Client-side driver 540 may send the returned data pages to the database tier components 560 as return data records 544, and database tier components 560 may then send the data pages to one or more client processes 510 as database query responses 517.

In some embodiments, various error and/or data loss messages 534 may be sent from distributed storage system 530 to database engine 520 (specifically to client-side driver 540). These messages may be passed from client-side driver 540 to database tier components 560 as error and/or loss reporting messages 545, and then to one or more client processes 510 along with (or instead of) a database query response 517.

In some embodiments, the APIs 531-534 of distributed storage system 530 and the APIs 541-545 of client-side driver 540 may expose the functionality of the distributed storage system 530 to database engine 520 as if database engine 520 were a client of distributed storage system 530. For example, database engine 520 (through client-side driver 540) may write redo log records or request data pages through these APIs to perform (or facilitate the performance of) various operations of the database system implemented by the combination of database engine 520 and distributed storage system 530 (e.g., storage, access, change logging, recovery, and/or space management operations). As illustrated in FIG. 5, distributed storage system 530 may store data blocks on storage nodes **535*a*-535*n*, each of which may have multiple attached SSDs. In some embodiments, distributed storage system 530** may provide high durability for stored data block through the application of various types of redundancy schemes.

Note that in various embodiments, the API calls and responses between database engine 520 and distributed storage system 530 (e.g., APIs 531-534) and/or the API calls and responses between client-side driver 540 and database tier components 560 (e.g., APIs 541-545) in FIG. 5 may be performed over a secure proxy connection (e.g., one managed by a gateway control plane), or may be performed over the public network or, alternatively, over a private channel such as a virtual private network (VPN) connection. These and other APIs to and/or between components of the database systems described herein may be implemented according to different technologies, including, but not limited to, Simple Object Access Protocol (SOAP) technology and Representational state transfer (REST) technology. For example, these APIs may be, but are not necessarily, implemented as SOAP APIs or RESTful APIs. SOAP is a protocol for exchanging information in the context of network-based services. REST is an architectural style for distributed hypermedia systems. A RESTful API (which may also be referred to as a RESTful network-based service) is a network-based service API implemented using HTTP and REST technology. The APIs described herein may in some embodiments be wrapped with client libraries in various languages, including, but not limited to, C, C++, Java, C# and Perl to support integration with database engine 520 and/or distributed storage system 530.

As noted above, in some embodiments, the functional components of a database system may be partitioned between those that are performed by the database engine and those that are performed in a separate, distributed, storage system. In one specific example, in response to receiving a request from a client process (or a thread thereof) to insert something into a database (e.g., to update a single data block by adding a record to that data block), one or more components of the database engine head node may perform query parsing, optimization, and execution, and may send each portion of the query to a transaction and consistency management component. The transaction and consistency management component may ensure that no other client process (or thread thereof) is trying to modify the same row at the same time. For example, the transaction and consistency management component may be responsible for ensuring that this change is performed atomically, consistently, durably, and in an isolated manner in the database. For example, the transaction and consistency management component may work together with the client-side storage service driver of the database engine head node to generate a redo log record to be sent to one of the nodes in the distributed storage service and to send it to the distributed storage service (along with other redo logs generated in response to other client requests) in an order and/or with timing that ensures the ACID properties are met for this transaction. Upon receiving the redo log record (which may be considered an "update record" by the storage service), the corresponding storage node may update the data block, and may update a redo log for the data block (e.g., a record of all changes directed to the data block). In some embodiments, the database engine may be responsible for generating an undo log record for this change, and may also be responsible for generating a redo log record for the undo log both of which may be used locally (in the database tier) for ensuring transactionality. However, unlike in traditional database systems, the systems described herein may shift the responsibility for applying changes to data blocks to the storage system (rather than applying them at the database tier and shipping the modified data blocks to the storage system).

A variety of different allocation models may be implemented for an SSD, in different embodiments. For example, in some embodiments, log entry pages and physical application pages may be allocated from a single heap of pages associated with an SSD device. This approach may have the advantage of leaving the relative amount of storage consumed by log pages and data pages to remain unspecified and to adapt automatically to usage. It may also have the advantage of allowing pages to remain unprepared until they are used, and repurposed at will without preparation. In other embodiments, an allocation model may partition the storage device into separate spaces for log entries and data pages. Once such allocation model is illustrated by the block diagram in FIG. 6 and described below.

Figure 6:
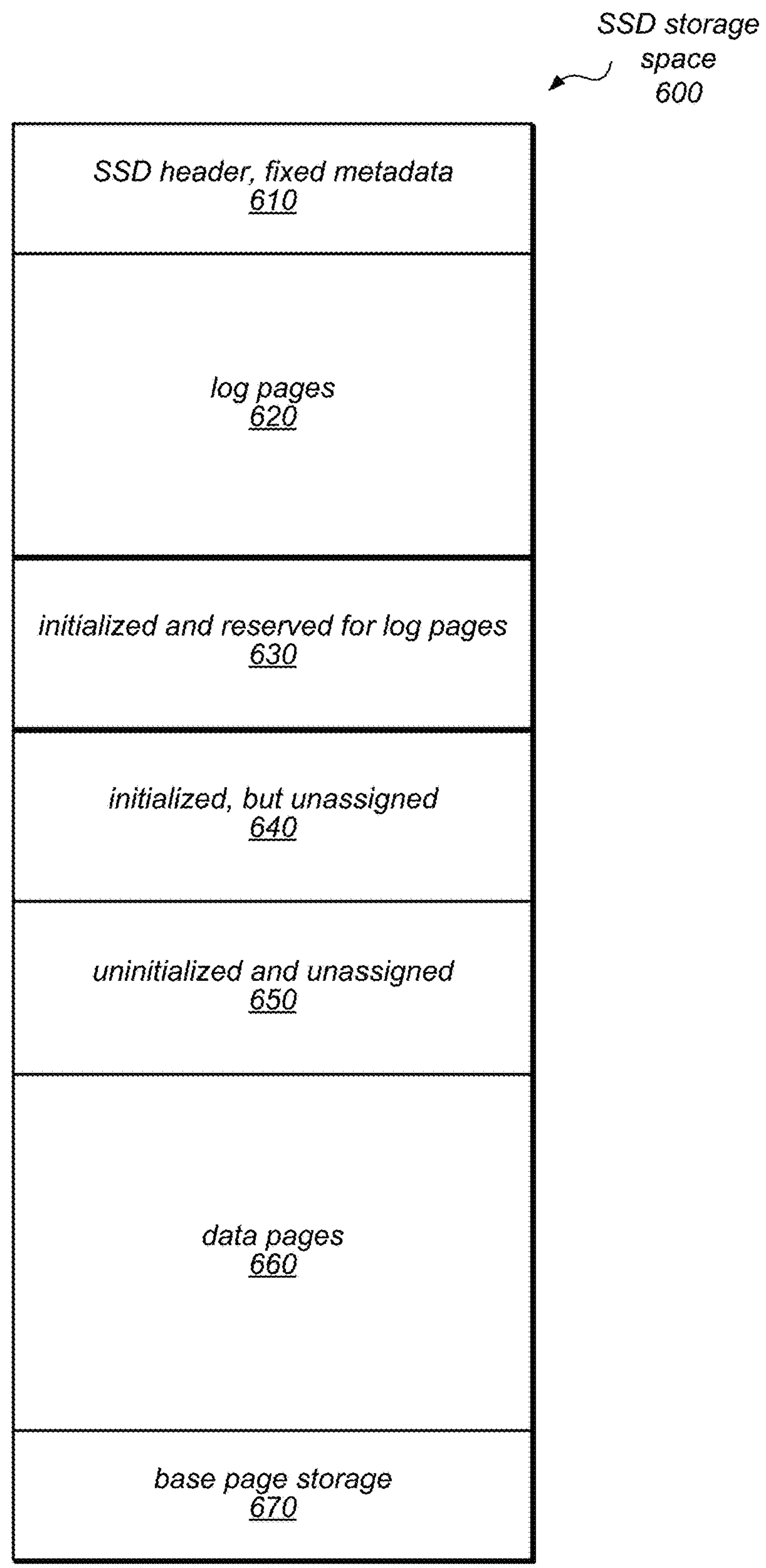
FIG. 6 is a block diagram illustrating how data and metadata may be stored on a storage node of a distributed storage system, according to some embodiments.

FIG. 6 is a block diagram illustrating how data and metadata may be stored on a given storage node (or persistent storage device) of a distributed storage system, according to one embodiment. In this example, SSD storage space 600 stores an SSD header and other fixed metadata in the portion of the space labeled 610. It stores log pages in the portion of the space labeled 620, and includes a space labeled 630 that is initialized and reserved for additional log pages. One portion of SSD storage space 600 (shown as 640) is initialized, but unassigned, and another portion of the space (shown as 650) is uninitialized and unassigned. Finally, the portion of SSD storage space 600 labeled 660 stores data pages. A base page storage portion 670 may be a fixed or assigned portion of SSD storage space 600 that maintains a respective entry for each user page. Alternatively, base page storage 670 may be dynamically allocated for user data pages as needed.

In this example, the first usable log page slot is noted as 615, and the last used log page slot (ephemeral) is noted as 625. The last reserved log page slot is noted as 635, and the last usable log page slot is noted as 645. In this example, the first used data page slot (ephemeral) is noted as 665. In some embodiments, the positions of each of these elements (615, 625, 635, 645, and 665) within SSD storage space 600 may be identified by a respective pointer.

In allocation approach illustrated in FIG. 6, valid log pages may be packed into the beginning of the flat storage space. Holes that open up due to log pages being freed may be reused before additional log page slots farther into the address space are used. For example, in the worst case, the first n log page slots contain valid log data, where n is the largest number of valid log pages that have ever simultaneously existed. In this example, valid data pages may be packed into the end of the flat storage space. Holes that open up due to data pages being freed may be reused before additional data page slots lower in the address space are used. For example, in the worst case, the last m data pages contain valid data, where m is the largest number of valid data pages that have ever simultaneously existed.

In some embodiments, before a log page slot can become part of the potential set of valid log page entries, it may need to be initialized to a value that cannot be confused for a valid future log entry page. This is implicitly true for recycled log page slots, since a retired log page has enough metadata to never be confused for a new valid log page. However, when a storage device is first initialized, or when space is reclaimed that had potentially been used to store application data pages, the log page slots may need to be initialized before they are added to the log page slot pool. In some embodiments, rebalancing/reclaiming log space may be performed as a background task.

In the example illustrated in FIG. 6, the current log page slot pool includes the area between the first usable log page slot (at 615) and the last reserved log page slot (625). In some embodiments, this pool may safely grow up to last usable log page slot (625) without re-initialization of new log page slots (e.g., by persisting an update to the pointer that identifies the last reserved log page slot, 635). In this example, beyond the last usable log page slot (which is identified by pointer 645), the pool may grow up to the first used data page slot (which is identified by pointer 665) by persisting initialized log page slots and persistently updating the pointer for the last usable log page slot (645). In this example, the previously uninitialized and unassigned portion of the SSD storage space 600 shown as 650 may be pressed into service to store log pages. In some embodiments, the current log page slot pool may be shrunk down to the position of the last used log page slot (which is identified by pointer) by persisting an update to the pointer for the last reserved log page slot (635).

In the example illustrated in FIG. 6, the current data page slot pool includes the area between the last usable log page slot (which is identified by pointer 645) and the end of SSD storage space 600. In some embodiments, the data page pool may be safely grown to the position identified by the pointer to the last reserved log page slot (635) by persisting an update to the pointer to the last usable log page slot (645). In this example, the previously initialized, but unassigned portion of the SSD storage space 600 shown as 640 may be pressed into service to store data pages. Beyond this, the pool may be safely grown to the position identified by the pointer to the last used log page slot (625) by persisting updates to the pointers for the last reserved log page slot (635) and the last usable log page slot (645), effectively reassigning the portions of SSD storage space 600 shown as 630 and 640 to store data pages, rather than log pages. In some embodiments, the data page slot pool may be safely shrunk down to the position identified by the pointer to the first used data page slot (665) by initializing additional log page slots and persisting an update to the pointer to the last usable log page slot (645).

In embodiments that employ the allocation approach illustrated in FIG. 6, page sizes for the log page pool and the data page pool may be selected independently, while still facilitating good packing behavior. In such embodiments, there may be no possibility of a valid log page linking to a spoofed log page formed by application data, and it may be possible to distinguish between a corrupted log and a valid log tail that links to an as-yet-unwritten next page. In embodiments that employ the allocation approach illustrated in FIG. 6, at startup, all of the log page slots up to the position identified by the pointer to the last reserved log page slot (635) may be rapidly and sequentially read, and the entire log index may be reconstructed (including inferred linking/ordering). In such embodiments, there may be no need for explicit linking between log pages, since everything can be inferred from LSN sequencing constraints.

In some embodiments, a segment may consist of different parts (or zones): one that contains a hot log, one that contains a cold log, one that contains user page data, and a backstop portion that includes an entry corresponding to an oldest or historical version of each user data page. Zones are not necessarily contiguous regions of an SSD. Rather, they can be interspersed at the granularity of the storage page (or a data block). In addition, there may be a root page for each segment that stores metadata about the segment and its properties. For example, the root page for a segment may store the user page size for the segment, the number of user pages in the segment, the current beginning/head of the hot log zone (which may be recorded in the form of a flush number), the volume epoch, access control metadata, and/or base page storage metadata or location information.

In some embodiments, the hot log zone may accept new writes from the client as they are received by the storage node. Both Delta User Log Records (DULRs), which specify a change to a user/data page in the form of a delta from the previous version of the page, and Absolute User Log Records (AULRs), which specify the contents of a complete user/data page, may be written completely into the log. Log records may be added to this zone in approximately the order they are received (e.g., they are not sorted by LSN) and they can span across log pages. The log records may be self-describing, e.g., they may contain an indication of their own size. In some embodiments, no garbage collection is performed in this zone. Instead, space may be reclaimed by truncating from the beginning of the log after all required log records have been copied into the cold log. Log sectors in the hot zone may be annotated with the most recent known unconditional VDL each time a sector is written. Conditional VDL CLRs may be written into the hot zone as they are received, but only the most recently written VDL CLR may be meaningful.

In some embodiments, every time a new log page is written, it may be assigned a flush number. The flush number may be written as part of every sector within each log page. Flush numbers may be used to determine which log page was written later when comparing two log pages. Flush numbers are monotonically increasing and scoped to an SSD (or storage node). For example, a set of monotonically increasing flush numbers is shared between all segments on an SSD (or all segments on a storage node).

In some embodiments, in the cold log zone, log records may be stored in increasing order of their LSNs. In this zone, AULRs may not necessarily store data in-line, depending on their size. For example, if they have large payloads, all or a portion of the payloads may be stored in the data zone and they may point to where their data is stored in the data zone. In some embodiments, log pages in the cold log zone may be written one full page at a time, rather than sector-by-sector. Because log pages in the cold zone are written a full page at a time, any log page in the cold zone for which the flush numbers in all sectors are not identical may be considered to be an incompletely written page and may be ignored. In some embodiments, in the cold log zone, DULRs may be able to span across log pages (up to a maximum of two log pages). However, AULRs may not be able to span log sectors, e.g., so that a coalesce operation will be able to replace a DULR with an AULR in a single atomic write.

Base page storage 670 may store the current or historical versions of user data pages in entries corresponding to user data pages. For example, a user page table, or other index, may include pointers, links, addresses, or some other form of mapping information or identifiers that lead to entries corresponding to particular user data pages. In some embodiments, individual entries may vary, with some entries comprising one or more data blocks or pages, while others comprise less than a block or page. Alternatively, in some other embodiments each entry corresponding to a user page may be a fixed, same size, such as 1 page. The data stored in entries may be compressed and/or encrypted according to user and/or system preference.

In some embodiments, the distributed storage systems described herein may maintain various data structures in memory. For example, for each user page present in a segment, a user page table may store a bit indicating whether or not this user page is "cleared" (i.e., whether it includes all zeroes), the LSN of the latest log record from the cold log zone for the page, and an array/list of locations of all log records from the hot log zone for page. For each log record, the user page table may store the sector number, the offset of the log record within that sector, the number of sectors to read within that log page, the sector number of a second log page (if the log record spans log pages), and the number of sectors to read within that log page. In some embodiments, the user page table may also store the LSNs of every log record from the cold log zone and/or an array of sector numbers for the payload of the latest AULR if it is in the cold log zone.

Figure 7:
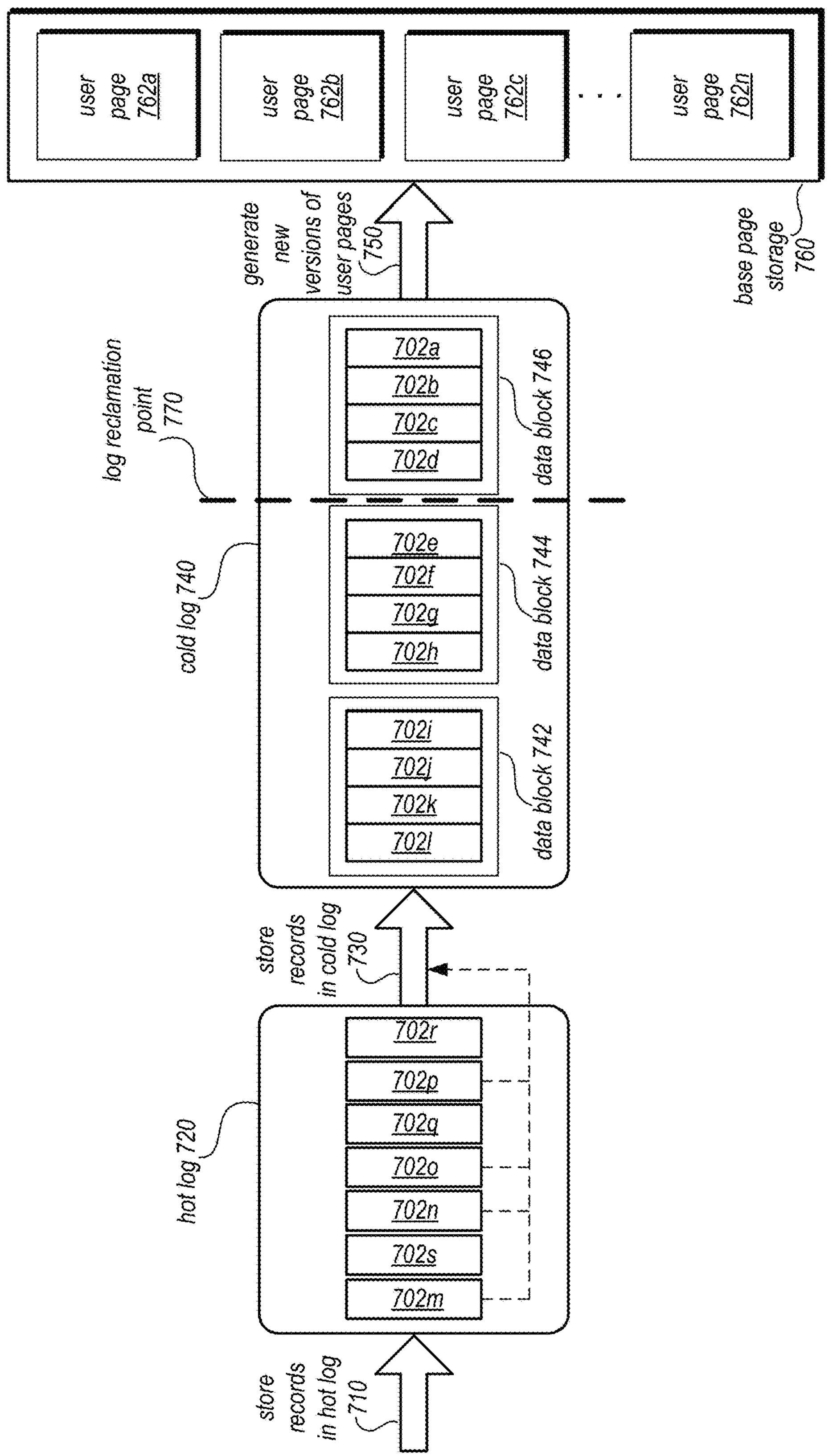
FIG. 7 is a data flow diagram illustrating efficient garbage collection for a distributed storage system, according to some embodiments.

In various embodiments, efficient garbage collection may be implemented to reclaim data blocks from the cold log zone. FIG. 7 is a data flow diagram illustrating efficient garbage collection for a distributed storage system, according to some embodiments. As noted above log records received at a storage node may be stored 710 in a hot log zone 720. Log records may be received out of order, appended to the hot log zone 720 as they are received. For example, in FIG. 7 the ordering of log records proceeds from record 702*r*, then 702*p*, 702*q*, 702*o*, 702*n*, 702*s*, and finally 702*m* (contrary to a sequential ordering which might start with 702*m* to 702*s*). Log records sent to a distributed storage system, such as described above in FIG. 5, may be sent asynchronously, leading to log records received out of order at hot log 720.

As discussed above, log records may be moved from the hot log 720 to the cold log 740. The cold log zone is populated by copying log records from the hot log zone. In some embodiments, only log records whose LSN is less than or equal to the current unconditional volume durable LSN (VDL) may be eligible to be copied to the cold log zone. When moving log records from the hot log zone to the cold log zone, some log records (such as many CLRs) may not need to be copied because they are no longer necessary. In addition, some additional coalescing of user pages may be performed at this point, which may reduce the amount of copying required. In some embodiments, log records stored in data blocks grouped together in log pages (although in the discussion with regard to FIG. 7 illustrates data blocks). In some embodiments, once a given hot zone block has been completely written and is no longer the newest hot zone data block, and all ULRs on the hot zone data block have been successfully copied to the cold log zone, the hot zone data block may be freed and reused. Consider the example illustrated in FIG. 7. Log records 702*m*, 702*n*, 702*o*, and 702*p*, make up the next four log records in the log record sequence to be persisted after log record 702*l*. Log record 702*p* may, for example, be less than the current unconditional VDL, and thus, as illustrated by the dashed line, log records 702*m*, 702*n*, 702*o*, and 702*p* may be stored in a new data block in cold log 740.

Cold log zone 740 may, in various embodiments, maintain log records for a log-structured data store in data blocks, such as data blocks described above. Data blocks 742, 744, and 746, for example, each maintain different log records, 702*a*, 702*b*, 702*c*, 702*d*, 702*e*, 702*f*, 702*g*, 702*h*, 702*i*, 702*j*, 702*k*, and 702*l* respectively. The log records, of which many various descriptions presented above, may be AULRs, DULRs, or any other type of log record for the example distributed storage system described above, or any other log-structured data store. These log records may be linked to or associated with a data page. For example, a log record may describe an update/change/modification for some portion, or all, of the data page, such as change relative to a previous record or version of the data page (e.g., a DULR). In some embodiments, log records may be stored sequentially in data blocks. Thus, the latest LSN in the ordering of log records maintained in a data block may indicate that all log records in the log page are prior to the latest LSN. Note that although data blocks are illustrated as containing the same number of log records, the number of log records stored in a data block may vary, and thus the illustration in FIG. 7 is not intended to be limiting.

Base page storage 760, similar to base page storage 670 above, may maintain entries or versions of user pages 762*a*, 762*b*, 762*c* through 762*n*. For example, each entry in base page storage 760 may maintain a replica or copy of the respective user page. In some embodiments, each entry may be compressed, encrypted, or otherwise modified. Other data, such as other log records linked to the data page, may also be stored with the data page in the entry for the data page in backstop 760.

A storage node or other system maintaining cold log 740 may determine when to perform efficient reclamation for log pages storing log records in cold log 740, such as detecting a reclamation event or receiving an indication to reclaim data blocks. For example, the workload of a storage node, such as the amount of foreground processing being performed (e.g., servicing write requests or read requests) may fall below a workload threshold, or some other measure, which may indicate that operational resources are available to perform data block reclamation. In some embodiments, available storage space, such as the number of pages available to store new data, such as log records, user data, or any other data, may be implemented. Various other factors, such as maintaining a reserve processing capacity for foreground processing, delaying until enough identified data blocks for reclamation are identified, or some other space or performance related factor may be used to detect or trigger the performance of efficient reclamation. In some embodiments, multiple factors may compete or indicate different timing for performing reclamation (e.g., available space vs. capacity to process). These various factors may thus be balanced, according to various priority rules or schemes. Similarly, efficient reclamation may be dynamically scheduled based on these multiple factors for performance at a later time. For instance, a reclamation event may be detected and reclamation may be performed quickly in response, or reclamation may be delayed as scheduled. Determining a schedule may be dynamic, changing the schedule for performing reclamation dependent on current factors effecting reclamation, such as the examples given above. A storage node may also receive an indication or instruction to perform reclamation of log pages from another system or component of the distributed storage system, such as volume manager 480 in FIG. 4.

The log records in cold log 740 may then be evaluated to identify data blocks to reclaim based, at least in part, on a cold log reclamation point 770. In some embodiments of the distributed storage systems described herein, an LSN index may be stored in memory. An LSN index may map LSNs to data blocks within the cold log zone. Given that log records in cold log zone 740 are sorted, the index may include one entry per data block. However, in some embodiments, every non-obsolete LSN may be identified in the index and mapped to the corresponding sector numbers, offsets, and numbers of sectors for each log record.

In some embodiments of the distributed storage systems described herein, a log page table may be stored in memory, and the log page table may be used during garbage collection of the cold log zone. For example, the log page table may identify which log records are obsolete (e.g., which log records can be garbage collected) and how much free space is available on each log page. As noted above, in some embodiments, groups of data blocks storing log records may be grouped together into log pages, upon which the various efficient garbage collection techniques may be performed in order to reclaim one or more whole log pages at a time.

FIG. 7 illustrates an example of evaluating log records in cold log 740 based on log reclamation point 770. Data blocks in the cold log 740 may be examined to determine whether the one or more log records in the data block are ready to be reclaimed. Data block 746 may include log records 702*a*, 702*b*, 702*c*, and 702*d*. As noted above, each of these log records may, in some embodiments, include a sequence number, (e.g., LSN described above), or some other ordering indicator. The log records in the data block may then be compared to the log reclamation point 740. If log records are prior to cold log reclamation point 770 in the log record sequence, then the data block may be reclaimed. FIG. 7 illustrates data blocks 742, 744, and 746, ordered according to the sequence of the log records they contain. In various embodiments, data blocks that may only contain log records less than, below or prior to cold log reclamation point 770 may be reclaimed. In the example illustrated in FIG. 7, data block 746 is identified for reclamation it falls below the log reclamation point 770 for cold log 740.

As noted above, log reclamation point 770 may be determined in different ways. For example, in some embodiments log reclamation point may be a garbage collection LSN (GCL) or some other indicator that is received from another storage system component, such as volume manager 480 in FIG. 4. The GCL may indicate that log records prior to the GCL (i.e. log records with lower LSNs) may have already been backed up to a data archive. For example, as illustrated in FIG. 2, other virtual computing services 230 may be a network-based data archive to which distributed storage service 220 may backup data to. Other data archive systems may also be implemented. A GCL may also be generated in response to user/client storage action, such as the creation of a snapshot of the database. A snapshot may be an indication that versions of data indicated by log records prior to the data pages may not need to be preserved at the storage node. Log reclamation point 770 may also be determined based, at least in part, on service level agreement, protocol, or some other data retention policy for preserving data. Storage nodes storing a segment may enforce the service level agreement, protocol, or schema individual, or concert with the distributed storage system, such as via volume manager 480.

In various embodiments, the evaluation of the log records in the cold log 740 may be performed by comparing the most recent log record (e.g., 702*d*, 702*h*, 702*l*) in a particular data block with log reclamation point 770, as the log records in a data block may be sorted according to their sequence. Alternatively, in some embodiments, mapping information such as an index (such as the index described in further detail below) or other data structure may include information such as the range of log records located in a particular data block, thus cold log 740 may be evaluated by evaluating the index structure for the cold log 740. Data blocks that are identified as maintaining log records in the log record sequence prior to the log reclamation point may be identified for reclamation.

For data blocks that have been identified for reclamation, the log records from the data block may be obtained and used to generate a new version of the respective user pages to which they are linked. As illustrated in FIG. 7, the newly generated versions of data pages may be stored 750 in entries for the respective data pages in base page storage 760. In some embodiments, the log records may be applied to a previous version of the page to which they are linked, and then a new version of the page may be generated. Log records may also indicate a new value for the data page or the entire data page itself (e.g., AULR). Please note, that the records, log pages, data pages, etc. illustrated in FIG. 7 are provided for illustrative purposes only, and are not intended to be limiting. For example, log pages may contain different numbers of log records. Moreover, log pages may not be laid out in sequential order in physical storage.

Data blocks identified for reclamation, such as data block 746, may be reclaimed. The log records in the data block may be read. Then, the changes indicated by the log record may be applied to a previous version of a user data page to which they are linked. For example, if the log record indicates that a particular record value is to state "blue" instead of the prior value of "red," then the version of the user data page with the prior value read may also be obtained/read, and the new value "blue" written in to replace "red." This process and/or similar processes of applying log records in identified data blocks may ultimately generate new versions of user pages 750, which may then be stored in their corresponding entries in base page storage 760. For example, multiple log records in data blocks being reclaimed may be linked to the same user page. For example, each log record may be updating the same record value (e.g., daily sales). Each of the log records in data blocks being reclaimed may be applied to the user page to which they are linked. In some embodiments, the log records from multiple data blocks may be applied in a batch or in one or more groups to generate one or more successive versions of the corresponding user page.

Once all of the log records from data blocks being reclaimed have been applied to generate new versions, the data blocks themselves may be reclaimed for storing new data. For example, in some embodiments, the log page table or other index, listing, or metadata describing available data blocks (or pages) may be updated to include the newly reclaimed data blocks. In some embodiments, a reformat process may be applied to make the data blocks ready for new data, while in other embodiments, the data blocks may already be in the correct format to store new data.

In the storage systems described herein, an extent may be a logical concept representing a highly durable unit of storage that can be combined with other extents (either concatenated or striped) to represent a volume. Each extent may be made durable by membership in a single protection group. An extent may provide an LSN-type read/write interface for a contiguous byte sub-range having a fixed size that is defined at creation. Read/write operations to an extent may be mapped into one or more appropriate segment read/write operations by the containing protection group. As used herein, the term "volume extent" may refer to an extent that is used to represent a specific sub-range of bytes within a volume.

As noted above, a volume may consist of multiple extents, each represented by a protection group consisting of one or more segments. In some embodiments, log records directed to different extents may have interleaved LSNs. For changes to the volume to be durable up to a particular LSN it may be necessary for all log records up to that LSN to be durable, regardless of the extent to which they belong. In some embodiments, the client may keep track of outstanding log records that have not yet been made durable, and once all ULRs up to a specific LSN are made durable, it may send a Volume Durable LSN (VDL) message to one of the protection groups in the volume. The VDL may be written to all synchronous mirror segments for the protection group. This is sometimes referred to as an "Unconditional VDL" and it may be periodically persisted to various segments (or more specifically, to various protection groups) along with write activity happening on the segments. In some embodiments, the Unconditional VDL may be stored in log sector headers.

In various embodiments, the operations that may be performed on a segment may include writing a DULR or AULR received from a client (which may involve writing the DULR or AULR to the tail of the hot log zone and then updating the user page table), reading a cold user page (which may involve locating the data sectors of the user page and returning them without needing to apply any additional DULRs), reading a hot user page (which may involve locating the data sectors of the most recent AULR for the user page and apply any subsequent DULRs to the user page before returning it), replacing DULRs with AULRs (which may involve coalescing DULRs for a user page to create an AULR that replaces the last DULR that was applied), manipulating the log records, etc. As described herein coalescing is the process of applying DULRs to an earlier version of a user page to create a later version of the user page. Coalescing a user page may help reduce read latency because (until another DULR is written) all DULRs written prior to coalescing may not need to be read and applied on demand. It may also help reclaim storage space by making old AULRs and DULRs obsolete (provided there is no snapshot requiring the log records to be present). In some embodiments, a coalescing operation may include locating a most recent AULR and applying any subsequent DULRs in sequence without skipping any of the DULRs. As noted above, in some embodiments, coalescing may not be performed within the hot log zone. Instead, it may be performed within the cold log zone. In some embodiments, coalescing may also be performed as log records are copied from the hot log zone to the cold log zone.

In some embodiments, the decision to coalesce a user page may be triggered by the size of the pending DULR chain for the page (e.g., if the length of the DULR chain exceeds a pre-defined threshold for a coalescing operation, according to a system-wide, application-specific or client-specified policy)), or by the user page being read by a client.

Figure 8:
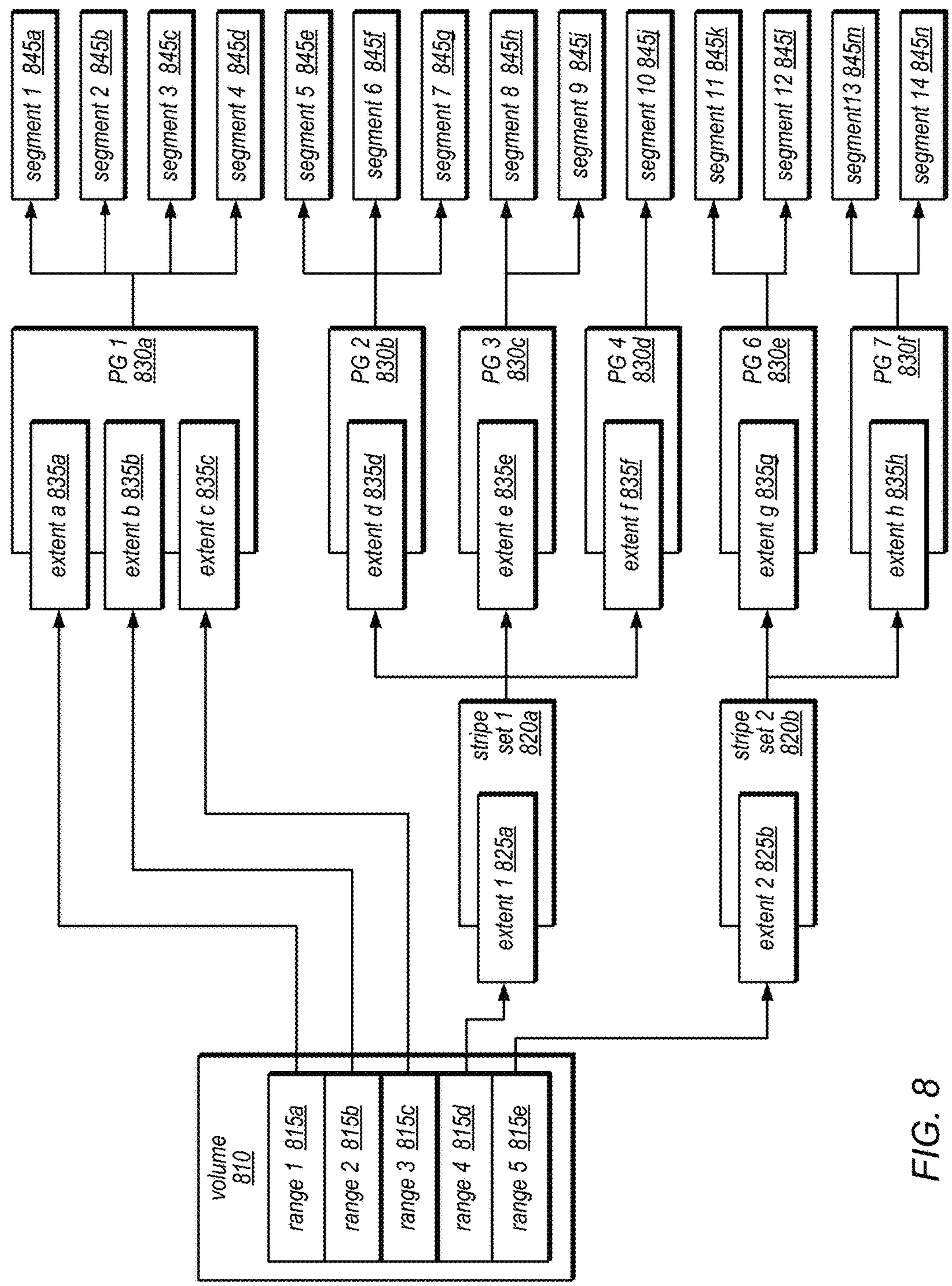
FIG. 8 is a block diagram illustrating an example configuration of a database volume, according to some embodiments.

FIG. 8 is a block diagram illustrating an example configuration of a database volume 810, according to one embodiment. In this example, data corresponding to each of various address ranges 815 (shown as address ranges 815*a*-815*e*) is stored as different segments 845 (shown as segments 845*a*-845*n*). More specifically, data corresponding to each of various address ranges 815 may be organized into different extents (shown as extents 825*a*-825*b*, and extents 835*a*-835*h*), and various ones of these extents may be included in different protection groups 830 (shown as 830*a*-730*f*), with or without striping (such as that shown as stripe set 820*a* and stripe set 820*b*). In this example, protection group 1 illustrates the use of erasure coding. In this example, protection groups 2 and 3 and protection groups 6 and 7 represent mirrored data sets of each other, while protection group 4 represents a single-instance (non-redundant) data set. In this example, protection group 8 represents a multi-tier protection group that combines other protection groups (e.g., this may represent a multi-region protection group). In this example, stripe set 1 (820*a*) and stripe set 2 (820*b*) illustrates how extents (e.g., extents 825*a* and 825*b*) may be striped into a volume, in some embodiments.

More specifically, in this example, protection group 1 (830*a*) includes extents a-c (835*a*-835*c*), which include data from ranges 1-3 (815*a*-815*c*), respectively, and these extents are mapped to segments 1-4 (845*a*-845*d*). Protection group 2 (830*b*) includes extent d (835*d*), which includes data striped from range 4 (815*d*), and this extent is mapped to segments 5-7 (845*e*-845*g*). Similarly, protection group 3 (830*c*) includes extent e (835*e*), which includes data striped from range 4 (815*d*), and is mapped to segments 8-9 (845*h*-845*i*); and protection group 4 (830*d*) includes extent f (735*f*), which includes data striped from range 4 (715*d*), and is mapped to segment 10 (845*j*). In this example, protection group 6 (830*e*) includes extent g (835*g*), which includes data striped from range 5 (815*e*), and is mapped to segments 11-12 (845*k*-845*l*); and protection group 7 (830*f*) includes extent h (835*h*), which also includes data striped from range 5 (815*e*), and is mapped to segments 13-14 (845*m*-845*n*).

Figure 9:
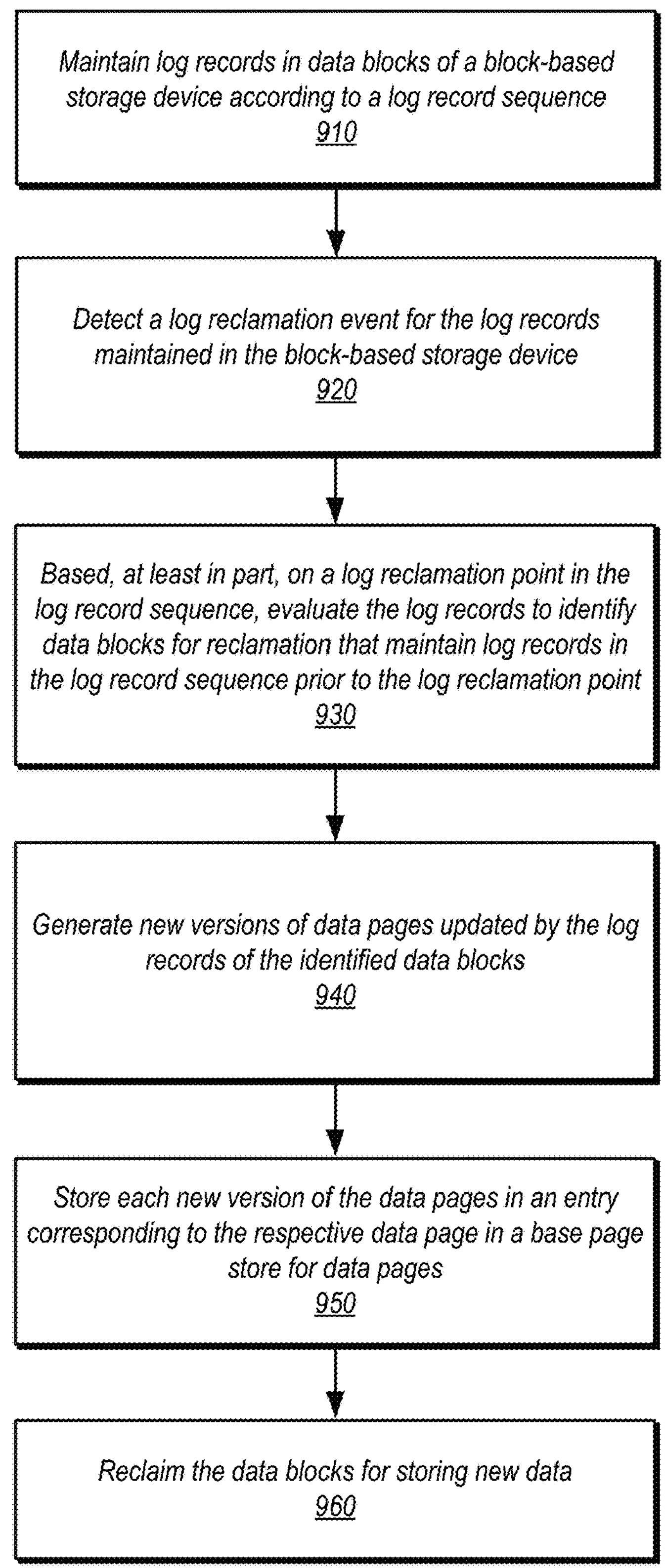
FIG. 9 is a high-level flowchart illustrating a method to implement efficient reclamation for a log-structured data store, according to some embodiments.

The various embodiments of a distributed storage system described with regard to FIGS. 2-8 above, may implement one or more different techniques for performing efficient garbage collection. Efficient garbage collection is not limited to such systems, however. Various other kinds of log-structured storage may implement efficient garbage collection. For example, log-structured data stores may not implement two log zones, such as the hot log and cold log described above. Instead, a single log zone may be used. FIG. 9 is a high-level flowchart illustrating a method to implement efficient reclamation for a log-structured data store, according to some embodiments. Different combinations of systems and/or devices may implement the various techniques discussed below.

As indicated at 910, log records may be maintained in data blocks of a block-based storage device according to a log record sequence. Each data block may store different numbers of log records according to their varying sizes, in some embodiments. A log record may indicate a change or update to data page. For example, a log record may describe a change or modification to be applied to a value of data located in the data store (e.g., increment value by 1, change date to "01-01-2001", etc. . . . ). In some embodiments, log records may be generated by a database, such as database service 210 described above, and describe a change to a record in the database. Data pages, may store data for a client/application/user. In some embodiments, the data pages may store data that is user visible data (i.e., data that a user of the distributed storage system expects to see which may be different from data that the distributed system stores to operate, and or data that a client system, which the user operates, stores to operate).

A log reclamation event for the log records maintained in the block-based storage device may be detected, as indicated at 920. In various embodiments, a log reclamation event may be detected at the system or device implementing the block-based storage, such as storage node 430 described above with regard to FIG. 4. Log reclamation events may be detected in different ways. For example, in some embodiments the amount of available or free space in the block-based storage device may fall below an available space threshold. Log reclamation events may also be detected when an implementing system has resources available to perform reclamation. A storage node, for instance, may process several foreground access requests (e.g., reads, writes). When sufficient operational resources become available however, a reclamation event may be triggered. Similarly, reclamation events may be scheduled, such as during a time period of low foreground processing activity (e.g., late night). As noted above, with regard to FIG. 7, many different factors may be used to schedule or delay performance of efficient garbage collection, even if a log reclamation event has been detected. Such a scheduling determination may be performed dynamically, based on current factors and/or performance of a storage node. Other nodes, systems, devices, or components may also delay efficient garbage collection. For example, a read-only node storing a replica of the database may also need to access (or currently be accessing) log records that are stored in data blocks identified for collection. The data blocks identified for garbage collection may be delayed until the read-only node has finished accessing the log records (or data pages associated with the log records).

In distributed storage systems, each implementing their own block-based storage devices, detecting a reclamation event, and performing reclamation may be done independent of other storage nodes. For example, a volume manager device, such as volume manager 480, client-side storage service driver 425, another storage node all described above in FIG. 4, or another system, node, module, or device (e.g., a storage service repair module) may send the same log reclamation point to each storage node. However, in some embodiments, each storage node may not use the log reclamation point, until it individually detects a log reclamation event.

As indicated at 930, the log records may be evaluated to identify data blocks for reclamation based, at least in part, on a log reclamation point in the log record sequence. The identified data blocks may, in various embodiments, maintain log records prior to the log reclamation point in the log record sequence. For example, if a data block has a highest LSN value of 100, and the log reclamation point is 120, then the data block may be identified for reclamation. However, in some embodiments, data blocks with only some log records prior to the log reclamation point may not be identified for collection. For example if a data block contains the log records 100-150, then log records 120-150 would not yet be collectible. Instead of moving out the collectible records (e.g., 100-119), the data block may remain untouched until all of the log records in the data block become collectible. As, in various embodiments, the log reclamation point may change or advance over time, data blocks that were once uncollectible may, at a later time, become collectible.

In order to make the determination as to the log records maintained in data block, different techniques may be employed. In some embodiments, the log records in the data block (which may be a range of log records in the log record sequence) may be stored sequentially and thus the last/first log record may also be the most recent (e.g., highest). Determining the position of this log record in the log record sequence may be sufficient to determine whether all of the log records in the data block may be collected. In other embodiments, mapping information, such as an index or other data structure may be maintained that may be searched in lieu of accessing the data blocks themselves. Many other ways may be used to determine the contents of a data block for comparison with the log reclamation point. Accordingly, the previous examples are not intended to be limiting.

In some embodiments, new versions of data pages may be generated according to respective updates indicated in the log records maintained in the identified data blocks, as indicated at 940. Log records, such as those discussed above with regard to FIGS. 2-8, may describe relative or absolute changes to data stored in data pages. Applying the log records to a version of data pages, or replacing a value of a version of data page with a value indicated in a log record, may generate a new version of the data page. These new versions may represent a current or historical version of data page. Each new version may then be stored in a corresponding entry to the respective data page in a base page store for data pages, as indicated at 950. A base page store may be an area or portion of a storage node, either on the same block-based storage device as the log records or another persistent storage device that may maintain a respective version of data pages. The actual entries may be compressed and/or encrypted. Additional space for each data page may also be included to store one or more additional log records linked to the data page and/or other data, such as metadata about the particular data page. Identified data blocks may then be reclaimed for storing new data, as indicated at 960.

Various different access requests may be directed toward the data pages, versions of which may be stored in the base page storage. In some embodiments, access requests for a data page may be serviced by accessing and/or obtaining a version of the data page stored in the base page storage. For example, base page storage may have an entry of a data page that is infrequently updated. As a result, the most current version of the data page may be stored in the base page storage without applying any additional log records (as all log records associated with the data page have been garbage collected. However, in some embodiments, the version of the data page in base page storage may be used to generate a current version of a data page in order to service an access request. For example, in some embodiments, an access request for a data page may be received, a version of the data page from the base page storage obtained, one or more log records still maintained in the data blocks applied to the version, and the current version sent in response to the request.

Figure 10:
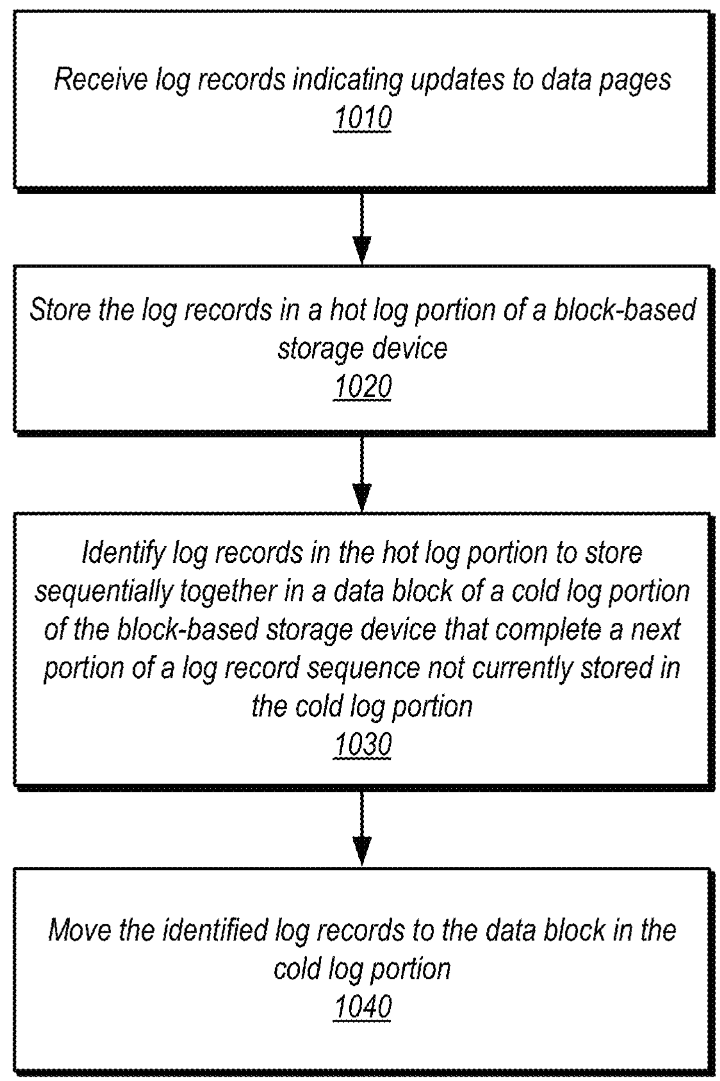
FIG. 10 is a high-level flowchart illustrating a method to store log records in a block-based storage device, according to some embodiments.

Turning to FIG. 10, log records may be stored in a log-structured data store in several ways. In some embodiments, log records may arrive at the data store out of order (e.g., as they are sent across an unreliable network connection). FIG. 10 is a high-level flowchart illustrating a method to store log records in a block-based storage device, according to some embodiments. As indicated at 1010, log records may be received indicating updates to data pages maintained at the log-structured data store. The log records may then be stored in a hot log portion of the block-based storage device, as indicated at 1020. The hot log portion may append log records as they are received. Over time, a complete sequence of log records (i.e. sequence of log records with no holes or gaps) may be stored in the hot log portion. Such log records may be identified to be stored sequentially together in a data block of a cold log portion of the block-based storage device, as indicated at 1030. Determining which log records to identify may be based on determining whether log records complete a next portion of the log record sequence not currently stored in the cold log. For example, if the cold log stores log records up to LSN 1000, and log records with LSNs 1001-1010 are now stored in the hog log portion, these log records may be identified as log records to be moved to a data block in the cold log portion. As indicated at 1040, identified log records may be moved from the hot log portion to the data block in the cold log portion.

Figure 11:
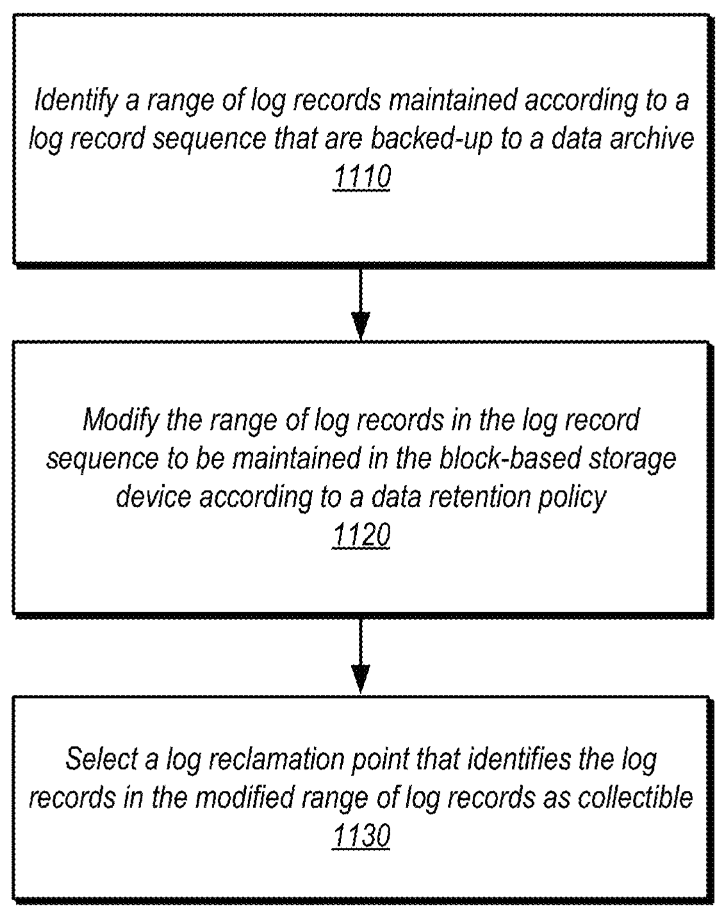
FIG. 11 is a high-level flowchart illustrating a method to determine a log reclamation point, according to some embodiments.

Turning to FIG. 11, determining a log reclamation point for performing efficient garbage collection may be performed in various ways. One or more different factors may be combined to determine the log reclamation point. For example, user initiated storage actions, such as a request to create a snapshot of data stored for the user, may inform the log records that may need to be maintained. As mentioned above, a snapshot, such as the snapshot of the database described above may need to be maintained in log records at the storage node (and thus not be collectible) in order to provide for a quick restoration of the view of the data at the time of the snapshot. Thus, a snapshot may limit the number of log records that may be collected, and thus limit the log reclamation point. Other factors, such as the log records backed-up to a data archive and/or a data retention policy may also be used. FIG. 11 is a high-level flowchart illustrating a method to determine a log reclamation point, according to some embodiments involving one or more of the different factors that may be involved in determining a log reclamation point. A storage node or other system or device implementing a log-structured data store may perform the following techniques. Similarly, another system or device, such as volume manager 480 in FIG. 4, may also perform the illustrated techniques.

As indicated at 1110, a range of log records maintained according to a log record sequence that are backed-up to a data archive may be identified. In some embodiments, the storage node may transfer the log records to another system, such as network-based data archive service (e.g., other service 230 in FIG. 2). As the log records are transferred, mapping information, metadata, or an index of log records may be updated to indicate that the respective log record is now in a data archive. Such an index may be evaluated to determine the range of log records. In some embodiments, another system or device, such as volume manager 480 in FIG. 4, may send an indication to a storage node indicating a range of log records backed-up to a data archive.

The range of log records may, in some embodiments, be used to select a log reclamation point that reflects the range of archived log records. However, in other embodiments, the range of log records may be modified according to a data retention policy for log records, as indicated at 1120. For example, a data retention policy may define a time period, amount, or other specification that directs that data be preserved in log record form at the block-based storage device. Such a policy may be informed by a service level agreement with a user of the block-based storage device, or an API or other protocol between the storage device and an application. If, for example, the range of archived log records is 1-1000, and the data retention policy requires the last 3 days of log records remain on the block-based storage device (where log records 900-1000 are within the last 3 days), the range of log records in the sequence may be modified to be 1-899. A data retention policy may act, in various embodiments, as a rolling window of log records that may need to be maintained at storage nodes. As indicated at 1130, the log reclamation point that identifies the log records in the modified range may be selected (e.g., log reclamation point 900), as indicated at 1130.

The methods described herein may in various embodiments be implemented by any combination of hardware and software. For example, in one embodiment, the methods may be implemented by a computer system (e.g., a computer system as in FIG. 12) that includes one or more processors executing program instructions stored on a computer-readable storage medium coupled to the processors. The program instructions may be configured to implement the functionality described herein (e.g., the functionality of various servers and other components that implement the database services/systems and/or storage services/systems described herein).

The various methods as illustrated in the figures and described herein represent example embodiments of methods. The methods may be implemented manually, in software, in hardware, or in a combination thereof. The order of any method may be changed, and various elements may be added, reordered, combined, omitted, modified, etc.

Figure 12:
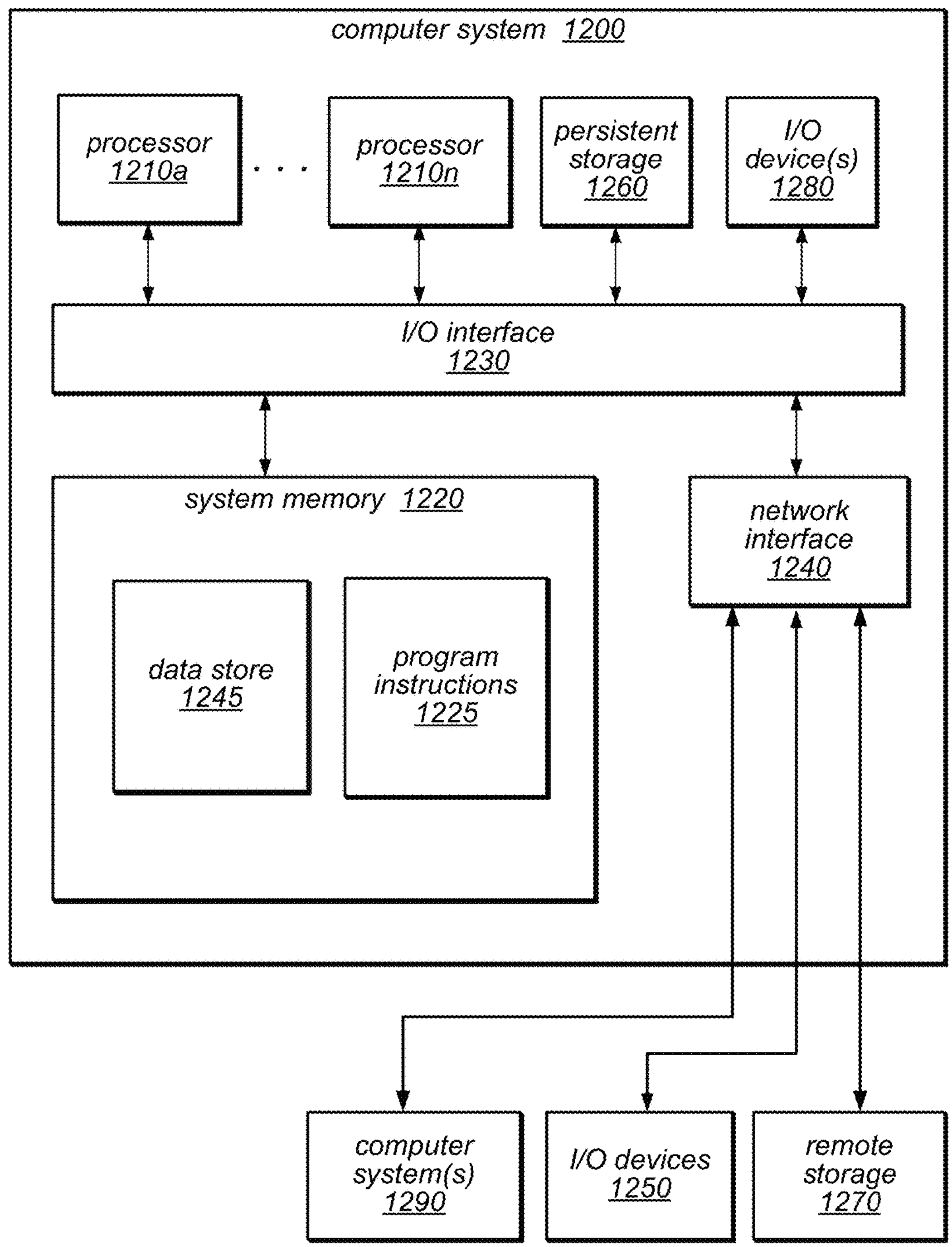
FIG. 12 is an example computer system, according to various embodiments.

FIG. 12 is a block diagram illustrating a computer system configured to implement at least a portion of the database systems described herein, according to various embodiments. For example, computer system 1200 may be configured to implement a database engine head node of a database tier, or one of a plurality of storage nodes of a separate distributed storage system that stores databases and associated metadata on behalf of clients of the database tier, in different embodiments. Computer system 1200 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1200 includes one or more processors 1210 (any of which may include multiple cores, which may be single or multi-threaded) coupled to a system memory 1220 via an input/output (I/O) interface 1230. Computer system 1200 further includes a network interface 1240 coupled to I/O interface 1230. In various embodiments, computer system 1200 may be a uniprocessor system including one processor 1210, or a multiprocessor system including several processors 1210 (e.g., two, four, eight, or another suitable number). Processors 1210 may be any suitable processors capable of executing instructions. For example, in various embodiments, processors 1210 may be general-purpose or embedded processors implementing any of a variety of instruction set architectures (ISAs), such as the x86, PowerPC, SPARC, or MIPS ISAs, or any other suitable ISA. In multiprocessor systems, each of processors 1210 may commonly, but not necessarily, implement the same ISA. The computer system 1200 also includes one or more network communication devices (e.g., network interface 1240) for communicating with other systems and/or components over a communications network (e.g. Internet, LAN, etc.). For example, a client application executing on system 1200 may use network interface 1240 to communicate with a server application executing on a single server or on a cluster of servers that implement one or more of the components of the database systems described herein. In another example, an instance of a server application executing on computer system 1200 may use network interface 1240 to communicate with other instances of the server application (or another server application) that may be implemented on other computer systems (e.g., computer systems 1290).

In the illustrated embodiment, computer system 1200 also includes one or more persistent storage devices 1260 and/or one or more I/O devices 1280. In various embodiments, persistent storage devices 1260 may correspond to disk drives, tape drives, solid state memory, other mass storage devices, or any other persistent storage device. Computer system 1200 (or a distributed application or operating system operating thereon) may store instructions and/or data in persistent storage devices 1260, as desired, and may retrieve the stored instruction and/or data as needed. For example, in some embodiments, computer system 1200 may host a storage system server node, and persistent storage 1260 may include the SSDs attached to that server node.

Computer system 1200 includes one or more system memories 1220 that are configured to store instructions and data accessible by processor(s) 1210. In various embodiments, system memories 1220 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1220 may contain program instructions 1225 that are executable by processor(s) 1210 to implement the methods and techniques described herein. In various embodiments, program instructions 1225 may be encoded in platform native binary, any interpreted language such as Java™ byte-code, or in any other language such as C/C++, Java™, etc., or in any combination thereof For example, in the illustrated embodiment, program instructions 1225 include program instructions executable to implement the functionality of a database engine head node of a database tier, or one of a plurality of storage nodes of a separate distributed storage system that stores databases and associated metadata on behalf of clients of the database tier, in different embodiments. In some embodiments, program instructions 1225 may implement multiple separate clients, server nodes, and/or other components.

In some embodiments, program instructions 1225 may include instructions executable to implement an operating system (not shown), which may be any of various operating systems, such as UNIX, LINUX, Solaris™, MacOS™, Windows™, etc. Any or all of program instructions 1225 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1200 via I/O interface 1230. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1200 as system memory 1220 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1240.

In some embodiments, system memory 1220 may include data store 1245, which may be configured as described herein. For example, the information described herein as being stored by the database tier (e.g., on a database engine head node), such as a transaction log, an undo log, cached page data, or other information used in performing the functions of the database tiers described herein may be stored in data store 1245 or in another portion of system memory 1220 on one or more nodes, in persistent storage 1260, and/or on one or more remote storage devices 1270, at different times and in various embodiments. Similarly, the information described herein as being stored by the storage tier (e.g., redo log records, coalesced data pages, and/or other information used in performing the functions of the distributed storage systems described herein) may be stored in data store 1245 or in another portion of system memory 1220 on one or more nodes, in persistent storage 1260, and/or on one or more remote storage devices 1270, at different times and in various embodiments. In general, system memory 1220 (e.g., data store 1245 within system memory 1220), persistent storage 1260, and/or remote storage 1270 may store data blocks, replicas of data blocks, metadata associated with data blocks and/or their state, database configuration information, and/or any other information usable in implementing the methods and techniques described herein.

In one embodiment, I/O interface 1230 may be configured to coordinate I/O traffic between processor 1210, system memory 1220 and any peripheral devices in the system, including through network interface 1240 or other peripheral interfaces. In some embodiments, I/O interface 1230 may perform any necessary protocol, timing or other data transformations to convert data signals from one component (e.g., system memory 1220) into a format suitable for use by another component (e.g., processor 1210). In some embodiments, I/O interface 1230 may include support for devices attached through various types of peripheral buses, such as a variant of the Peripheral Component Interconnect (PCI) bus standard or the Universal Serial Bus (USB) standard, for example. In some embodiments, the function of I/O interface 1230 may be split into two or more separate components, such as a north bridge and a south bridge, for example. Also, in some embodiments, some or all of the functionality of I/O interface 1230, such as an interface to system memory 1220, may be incorporated directly into processor 1210.

Network interface 1240 may be configured to allow data to be exchanged between computer system 1200 and other devices attached to a network, such as other computer systems 1290 (which may implement one or more storage system server nodes, database engine head nodes, and/or clients of the database systems described herein), for example. In addition, network interface 1240 may be configured to allow communication between computer system 1200 and various I/O devices 1250 and/or remote storage 1270. Input/output devices 1250 may, in some embodiments, include one or more display terminals, keyboards, keypads, touchpads, scanning devices, voice or optical recognition devices, or any other devices suitable for entering or retrieving data by one or more computer systems 1200. Multiple input/output devices 1250 may be present in computer system 1200 or may be distributed on various nodes of a distributed system that includes computer system 1200. In some embodiments, similar input/output devices may be separate from computer system 1200 and may interact with one or more nodes of a distributed system that includes computer system 1200 through a wired or wireless connection, such as over network interface 1240. Network interface 1240 may commonly support one or more wireless networking protocols (e.g., Wi-Fi/IEEE 802.11, or another wireless networking standard). However, in various embodiments, network interface 1240 may support communication via any suitable wired or wireless general data networks, such as other types of Ethernet networks, for example. Additionally, network interface 1240 may support communication via telecommunications/telephony networks such as analog voice networks or digital fiber communications networks, via storage area networks such as Fibre Channel SANs, or via any other suitable type of network and/or protocol. In various embodiments, computer system 1200 may include more, fewer, or different components than those illustrated in FIG. 12 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a database engine head node within the database tier of a database system may present database services and/or other types of data storage services that employ the distributed storage systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A database system comprising one or more storage nodes configured to:

store a log in a plurality of data blocks on one or more storage devices, the log comprising a plurality of log records associated with respective write requests to a database;

store a data retention policy specifying one or more specifications controlling preservation of the plurality of log records on the storage devices; and detect a log reclamation event for the log, and responsive to the log reclamation event:

identify a range of log records that are currently stored in the log and that have also been stored to a data archive;

select from within a range defined by the identified range of archived log records, based at least in part on the data retention policy, a log reclamation point in the log that identifies one or more log records in the range as collectible; and perform a garbage collection to reclaim one or more of the plurality of data blocks storing the one or more collectible log records.

2. The database system as recited in claim 1, wherein the one or more storage nodes are configured to store a data retention policy that specifies a time period to preserve log records.

3. The database system as recited in claim 1, wherein the one or more storage nodes are configured to store a data retention policy that specifies an amount of log records to preserve.

4. The database system as recited in claim 1, wherein the one or more storage nodes are configured to store a data retention policy that specifies a rolling window of log records to preserve.

5. The database system as recited in claim 1, wherein the one or more storage nodes are configured to perform a garbage collection to reclaim data blocks that store only collectible log records.

6. A computer-implemented method, comprising:

storing a log for a database on one or more block-based storage devices, the log comprising a plurality of log records generated in response to a plurality of write requests to the database;

accessing a data retention policy specifying one or more specifications controlling preservation of the plurality of log records on the block-based storage devices;

identifying a range of log records that are currently stored in the log and that have also been stored to a data archive;

selecting from within a range defined by the identified range of archived log records, a log reclamation point in the log that identifies one or more log records in the log as collectible, based at least in part on a data retention policy; and performing a garbage collection to reclaim one or more of data blocks in the block-based storage devices storing the one or more collectible log records.

7. The computer-implemented method as recited in claim 6, wherein accessing the data retention policy comprises accessing a data retention policy that specifies a time period to preserve log records.

8. The computer-implemented method as recited in claim 6, wherein accessing the data retention policy comprises accessing a data retention policy that specifies an amount of log records to preserve.

9. The computer-implemented method as recited in claim 6, wherein accessing the data retention policy comprises accessing a data retention policy that specifies a rolling window of log records to preserve.

10. The computer-implemented method as recited in claim 6, wherein performing a garbage collection comprises reclaiming one or more data blocks that store only collectible log records.

11. The computer-implemented method as recited in claim 6, further comprising archiving a set of the plurality of log records to the data archive prior to the garbage collection, and wherein selecting a log reclamation point comprises selecting one or more log records from the set of archived log records.

12. The computer-implemented method as recited in claim 11, wherein archiving the set of the plurality of log records comprises updating metadata associated with the log, and wherein selecting one or more log records from the set of archived log records is based at least in part on the metadata.

13. The computer-implemented method as recited in claim 6, wherein selecting a log reclamation point is based at least in part on a user initiated storage action.

14. A non-transitory computer-accessible storage medium storing program instructions that when executed by one or more processors cause the processors to:

store a log for a database on a plurality of blocks of one or more storage devices, the log comprising a plurality of log records generated in response to a plurality write requests to the database;

access a data retention policy specifying one or more specifications controlling preservation of the plurality of log records on the block-based storage devices;

identify a range of log records that are currently stored in the log and that have also been stored to a data archive;

select from within a range defined by the identified range of archived log records, a log reclamation point in the log that identifies one or more log records in the log as collectible, based at least in part on a data retention policy; and perform a garbage collection to reclaim one or more of the plurality of data blocks of the storage devices storing the one or more collectible log records.

15. The non-transitory computer-accessible storage medium as recited in claim 14, wherein accessing the data retention policy comprises accessing a data retention policy that specifies a time period to preserve log records.

16. The non-transitory computer-accessible storage medium as recited in claim 14, wherein accessing the data retention policy comprises accessing a data retention policy that specifies an amount of log records to preserve.

17. The non-transitory computer-accessible storage medium as recited in claim 14, wherein accessing the data retention policy comprises accessing a data retention policy that specifies a rolling window of log records to preserve.

18. The non-transitory computer-accessible storage medium as recited in claim 14, wherein to perform the garbage collection, the program instructions when executed by one or more processors cause the processors to:

generate new versions of data pages updated by the collectible log records; and store each of the new versions of the data pages in an entry corresponding to the respective data page in a base page store for data pages.

19. The non-transitory computer-accessible storage medium as recited in claim 14, wherein the selecting of a log reclamation point is based at least in part on a user initiated storage action.

* * * * *